US009772413B2

(12) United States Patent
Krohn et al.

(10) Patent No.: US 9,772,413 B2
(45) Date of Patent: Sep. 26, 2017

(54) SIMULTANEOUS SOURCING DURING BOTH SEISMIC ACQUISITION AND SEISMIC INVERSION

(71) Applicants: Christine E. Krohn, Houston, TX (US); Partha S. Routh, Katy, TX (US)

(72) Inventors: Christine E. Krohn, Houston, TX (US); Partha S. Routh, Katy, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 584 days.

(21) Appl. No.: 14/329,431

(22) Filed: Jul. 11, 2014

(65) Prior Publication Data

US 2015/0057938 A1    Feb. 26, 2015

Related U.S. Application Data

(60) Provisional application No. 61/869,292, filed on Aug. 23, 2013.

(51) Int. Cl.
*G01V 1/00* (2006.01)
*G01V 1/28* (2006.01)
(Continued)

(52) U.S. Cl.
CPC .............. *G01V 1/282* (2013.01); *G01V 1/003* (2013.01); *G01V 1/005* (2013.01); *G01V 1/247* (2013.01);
(Continued)

(58) Field of Classification Search
CPC .... G01V 1/28; G01V 1/3808; G01V 2210/51; G01V 1/38; G01V 2210/56;
(Continued)

(56) References Cited

U.S. PATENT DOCUMENTS 3,812,457 A    5/1974  Weller
3,864,667 A    2/1975  Bahjat
(Continued)

FOREIGN PATENT DOCUMENTS

CA    2 796 631    11/2011
EP    1 094 338    4/2001
(Continued)

OTHER PUBLICATIONS

Mora, P. (1987), "Elastic Wavefield Inversion," PhD Thesis, Stanford University, pp. 22-25.
(Continued)

*Primary Examiner* — Roy Y Yi
(74) *Attorney, Agent, or Firm* — ExxonMobil Upstream Research Company, Law Department

(57) ABSTRACT

Method for acquiring, at reduced acquisition cost, seismic data using simultaneous, field-encoded sources in the field (702), and then constructing pseudo source-records (703) that better meet the requirements for using additional simultaneous computer-encoded sourcing for computer simulations or forward modeling (706) as part of (707) iterative FWI (Full Wavefield Inversion) or RTM (Reverse Time Migration), with additional reduction in computational costs. By better meeting the requirements of simultaneous sourcing for FWI or RTM (701), artifacts and crosstalk are reduced in the output. The method can be used for marine streamer acquisition and other non-fixed spread geometries to acquire both positive and negative offsets and to mitigate the "missing data" problem for simultaneous-source FWI. It can also be used for land data to overcome issues with moving spreads and long continuous records.

22 Claims, 17 Drawing Sheets

(51) Int. Cl.
*G01V 1/24* (2006.01)
*G01V 1/30* (2006.01)
*G01V 1/38* (2006.01)

(52) U.S. Cl.
CPC ............ *G01V 1/303* (2013.01); *G01V 1/3808* (2013.01); *G01V 1/38* (2013.01); *G01V 2210/1212* (2013.01); *G01V 2210/1423* (2013.01); *G01V 2210/32* (2013.01); *G01V 2210/6161* (2013.01); *G01V 2210/6222* (2013.01); *G01V 2210/66* (2013.01)

(58) Field of Classification Search
CPC ............... G01V 2210/67; G01V 1/282; G01V 2210/20; G01V 1/36; G01V 1/364; G01V 1/005; G01V 2210/32; G01V 2210/57; G01V 1/003
See application file for complete search history.

(56) References Cited

U.S. PATENT DOCUMENTS

| | | |
|---|---|---|
| 4,159,463 A | 6/1979 | Silverman |
| 4,168,485 A | 9/1979 | Payton et al. |
| 4,545,039 A | 10/1985 | Savit |
| 4,562,540 A | 12/1985 | Devaney |
| 4,575,830 A | 3/1986 | Ingram et al. |
| 4,594,662 A | 6/1986 | Devaney |
| 4,636,956 A | 1/1987 | Vannier et al. |
| 4,675,851 A | 6/1987 | Savit et al. |
| 4,686,654 A | 8/1987 | Savit |
| 4,707,812 A | 11/1987 | Martinez |
| 4,715,020 A | 12/1987 | Landrum, Jr. |
| 4,766,574 A | 8/1988 | Whitmore et al. |
| 4,780,856 A | 10/1988 | Becquey |
| 4,823,326 A | 4/1989 | Ward |
| 4,924,390 A | 5/1990 | Parsons et al. |
| 4,953,657 A | 9/1990 | Edington |
| 4,969,129 A | 11/1990 | Currie |
| 4,982,374 A | 1/1991 | Edington et al. |
| 5,260,911 A | 11/1993 | Mason et al. |
| 5,469,062 A | 11/1995 | Meyer, Jr. |
| 5,583,825 A | 12/1996 | Carrazzone et al. |
| 5,677,893 A | 10/1997 | de Hoop et al. |
| 5,715,213 A | 2/1998 | Allen |
| 5,717,655 A | 2/1998 | Beasley |
| 5,719,821 A | 2/1998 | Sallas et al. |
| 5,721,710 A | 2/1998 | Sallas et al. |
| 5,790,473 A | 8/1998 | Allen |
| 5,798,982 A | 8/1998 | He et al. |
| 5,822,269 A | 10/1998 | Allen |
| 5,838,634 A | 11/1998 | Jones et al. |
| 5,852,588 A | 12/1998 | de Hoop et al. |
| 5,878,372 A | 3/1999 | Tabarovsky et al. |
| 5,920,828 A | 7/1999 | Norris et al. |
| 5,924,049 A | 7/1999 | Beasley et al. |
| 5,999,488 A | 12/1999 | Smith |
| 5,999,489 A | 12/1999 | Lazaratos |
| 6,005,916 A | 12/1999 | Johnson et al. |
| 6,014,342 A | 1/2000 | Lazaratos |
| 6,021,094 A | 2/2000 | Ober et al. |
| 6,028,818 A | 2/2000 | Jeffryes |
| 6,058,073 A | 5/2000 | VerWest |
| 6,125,330 A | 9/2000 | Robertson et al. |
| 6,219,621 B1 | 4/2001 | Hornbostel |
| 6,225,803 B1 | 5/2001 | Chen |
| 6,311,133 B1 | 10/2001 | Lailly et al. |
| 6,317,695 B1 | 11/2001 | Zhou et al. |
| 6,327,537 B1 | 12/2001 | Ikelle |
| 6,374,201 B1 | 4/2002 | Grizon et al. |
| 6,381,543 B1 | 4/2002 | Guerillot et al. |
| 6,388,947 B1 | 5/2002 | Washbourne et al. |
| 6,480,790 B1 | 11/2002 | Calvert et al. |
| 6,522,973 B2 | 2/2003 | Tonellot et al. |
| 6,545,944 B2 | 4/2003 | de Kok |
| 6,549,854 B1 | 4/2003 | Malinverno et al. |
| 6,574,564 B2 | 6/2003 | Lailly et al. |
| 6,593,746 B2 | 7/2003 | Stolarczyk |
| 6,662,147 B1 | 12/2003 | Fournier et al. |
| 6,665,615 B2 | 12/2003 | Van Riel et al. |
| 6,687,619 B2 | 2/2004 | Moerig et al. |
| 6,687,659 B1 | 2/2004 | Shen |
| 6,704,245 B2 | 3/2004 | Becquey |
| 6,714,867 B2 | 3/2004 | Meunier |
| 6,735,527 B1 | 5/2004 | Levin |
| 6,754,590 B1 | 6/2004 | Moldoveanu |
| 6,766,256 B2 | 7/2004 | Jeffryes |
| 6,826,486 B1 | 11/2004 | Malinverno |
| 6,836,448 B2 | 12/2004 | Robertsson et al. |
| 6,842,701 B2 | 1/2005 | Moerig et al. |
| 6,859,734 B2 | 2/2005 | Bednar |
| 6,865,487 B2 | 3/2005 | Charron |
| 6,865,488 B2 | 3/2005 | Moerig et al. |
| 6,876,928 B2 | 4/2005 | Van Riel et al. |
| 6,882,938 B2 | 4/2005 | Vaage et al. |
| 6,882,958 B2 | 4/2005 | Schmidt et al. |
| 6,901,333 B2 | 5/2005 | Van Riel et al. |
| 6,903,999 B2 | 6/2005 | Curtis et al. |
| 6,906,981 B2 | 6/2005 | Vauge |
| 6,927,698 B2 | 8/2005 | Stolarczyk |
| 6,944,546 B2 | 9/2005 | Xiao et al. |
| 6,947,843 B2 | 9/2005 | Fisher et al. |
| 6,970,397 B2 | 11/2005 | Castagna et al. |
| 6,977,866 B2 | 12/2005 | Huffman et al. |
| 6,999,880 B2 | 2/2006 | Lee |
| 7,046,581 B2 | 5/2006 | Calvert |
| 7,050,356 B2 | 5/2006 | Jeffryes |
| 7,069,149 B2 | 6/2006 | Goff et al. |
| 7,072,767 B2 | 7/2006 | Routh et al. |
| 7,092,823 B2 | 8/2006 | Lailly et al. |
| 7,110,900 B2 | 9/2006 | Adler et al. |
| 7,184,367 B2 | 2/2007 | Yin |
| 7,230,879 B2 | 6/2007 | Herkenhoff et al. |
| 7,271,747 B2 | 9/2007 | Baraniuk et al. |
| 7,330,799 B2 | 2/2008 | Lefebvre et al. |
| 7,337,069 B2 | 2/2008 | Masson et al. |
| 7,373,251 B2 | 5/2008 | Hamman et al. |
| 7,373,252 B2 | 5/2008 | Sherrill et al. |
| 7,376,046 B2 | 5/2008 | Jeffryes |
| 7,376,539 B2 | 5/2008 | Lecomte |
| 7,400,978 B2 | 7/2008 | Langlais et al. |
| 7,436,734 B2 | 10/2008 | Krohn |
| 7,480,206 B2 | 1/2009 | Hill |
| 7,584,056 B2 | 9/2009 | Koren |
| 7,599,798 B2 | 10/2009 | Beasley et al. |
| 7,602,670 B2 | 10/2009 | Jeffryes |
| 7,616,523 B1 | 11/2009 | Tabti et al. |
| 7,620,534 B2 | 11/2009 | Pita et al. |
| 7,620,536 B2 | 11/2009 | Chow |
| 7,646,924 B2 | 1/2010 | Donoho |
| 7,672,194 B2 | 3/2010 | Jeffryes |
| 7,672,824 B2 | 3/2010 | Dutta et al. |
| 7,675,815 B2 | 3/2010 | Saenger et al. |
| 7,679,990 B2 | 3/2010 | Herkenhoff et al. |
| 7,684,281 B2 | 3/2010 | Vaage et al. |
| 7,710,821 B2 | 5/2010 | Robertsson et al. |
| 7,715,985 B2 | 5/2010 | Van Manen et al. |
| 7,715,986 B2 | 5/2010 | Nemeth et al. |
| 7,725,266 B2 | 5/2010 | Sirgue et al. |
| 7,791,980 B2 | 9/2010 | Robertsson et al. |
| 7,835,072 B2 | 11/2010 | Izumi |
| 7,840,625 B2 | 11/2010 | Candes et al. |
| 7,940,601 B2 | 5/2011 | Ghosh |
| 8,121,823 B2 | 2/2012 | Krebs et al. |
| 8,248,886 B2 | 8/2012 | Neelamani et al. |
| 8,428,925 B2 | 4/2013 | Krebs et al. |
| 8,437,998 B2 | 5/2013 | Routh et al. |
| 8,688,381 B2 | 4/2014 | Routh et al. |
| 2002/0099504 A1 | 7/2002 | Cross et al. |
| 2002/0120429 A1 | 8/2002 | Ortoleva |
| 2002/0183980 A1 | 12/2002 | Guillaume |
| 2004/0199330 A1 | 10/2004 | Routh et al. |
| 2004/0225483 A1 | 11/2004 | Okoniewski et al. |
| 2005/0128874 A1 | 6/2005 | Herkenhoff et al. |

(56) References Cited

U.S. PATENT DOCUMENTS

| | | |
|---|---|---|
| 2006/0235666 A1 | 10/2006 | Assa et al. |
| 2007/0036030 A1 | 2/2007 | Baumel et al. |
| 2007/0038691 A1 | 2/2007 | Candes et al. |
| 2007/0165486 A1 | 7/2007 | Moldoveanu et al. |
| 2007/0274155 A1 | 11/2007 | Ikelle |
| 2008/0175101 A1 | 7/2008 | Saenger et al. |
| 2008/0306692 A1 | 12/2008 | Singer et al. |
| 2009/0006054 A1 | 1/2009 | Song |
| 2009/0067041 A1 | 3/2009 | Izumi |
| 2009/0070042 A1 | 3/2009 | Birchwood et al. |
| 2009/0083006 A1 | 3/2009 | Mackie |
| 2009/0164186 A1 | 6/2009 | Haase et al. |
| 2009/0164756 A1 | 6/2009 | Dokken et al. |
| 2009/0187391 A1 | 7/2009 | Wendt et al. |
| 2009/0248308 A1 | 10/2009 | Luling |
| 2009/0254320 A1 | 10/2009 | Lovatini et al. |
| 2009/0259406 A1 | 10/2009 | Khadhraoui et al. |
| 2010/0008184 A1 | 1/2010 | Hegna et al. |
| 2010/0018718 A1 | 1/2010 | Krebs et al. |
| 2010/0039894 A1 | 2/2010 | Abma et al. |
| 2010/0054082 A1 | 3/2010 | McGarry et al. |
| 2010/0088035 A1 | 4/2010 | Etgen et al. |
| 2010/0103772 A1 | 4/2010 | Eick et al. |
| 2010/0118651 A1 | 5/2010 | Liu et al. |
| 2010/0142316 A1 | 6/2010 | Keers et al. |
| 2010/0161233 A1 | 6/2010 | Saenger et al. |
| 2010/0161234 A1 | 6/2010 | Saenger et al. |
| 2010/0185422 A1 | 7/2010 | Hoversten |
| 2010/0208554 A1 | 8/2010 | Chiu et al. |
| 2010/0212909 A1 | 8/2010 | Baumstein et al. |
| 2010/0265797 A1 | 10/2010 | Robertsson et al. |
| 2010/0270026 A1 | 10/2010 | Lazaratos et al. |
| 2010/0286919 A1 | 11/2010 | Lee et al. |
| 2010/0286921 A1* | 11/2010 | Lee .................... G01V 1/28 702/17 |
| 2010/0299070 A1 | 11/2010 | Abma |
| 2011/0000678 A1 | 1/2011 | Krebs et al. |
| 2011/0040926 A1 | 2/2011 | Frost et al. |
| 2011/0051553 A1 | 3/2011 | Scott et al. |
| 2011/0090760 A1 | 4/2011 | Rickett et al. |
| 2011/0131020 A1 | 6/2011 | Meng |
| 2011/0134722 A1 | 6/2011 | Virgilio et al. |
| 2011/0182141 A1 | 7/2011 | Zhamikov et al. |
| 2011/0182144 A1 | 7/2011 | Gray |
| 2011/0191032 A1 | 8/2011 | Moore |
| 2011/0194379 A1 | 8/2011 | Lee et al. |
| 2011/0222370 A1 | 9/2011 | Downton et al. |
| 2011/0227577 A1 | 9/2011 | Zhang et al. |
| 2011/0235464 A1 | 9/2011 | Brittan et al. |
| 2011/0238390 A1 | 9/2011 | Krebs et al. |
| 2011/0246140 A1 | 10/2011 | Abubakar et al. |
| 2011/0267921 A1 | 11/2011 | Mortel et al. |
| 2011/0267923 A1 | 11/2011 | Shin |
| 2011/0276320 A1 | 11/2011 | Krebs et al. |
| 2011/0288831 A1 | 11/2011 | Tan et al. |
| 2011/0299361 A1 | 12/2011 | Shin |
| 2011/0320180 A1 | 12/2011 | Al-Saleh |
| 2012/0010862 A1 | 1/2012 | Costen |
| 2012/0014215 A1 | 1/2012 | Saenger et al. |
| 2012/0014216 A1 | 1/2012 | Saenger et al. |
| 2012/0033525 A1 | 2/2012 | Abma et al. |
| 2012/0051176 A1 | 3/2012 | Liu |
| 2012/0073824 A1 | 3/2012 | Routh |
| 2012/0073825 A1 | 3/2012 | Routh |
| 2012/0082344 A1 | 4/2012 | Donoho |
| 2012/0143506 A1 | 6/2012 | Routh et al. |
| 2012/0215506 A1 | 8/2012 | Rickett et al. |
| 2012/0253682 A1* | 10/2012 | Andreoletti ............ G01V 1/282 702/16 |
| 2012/0275264 A1 | 11/2012 | Kostov et al. |
| 2012/0275267 A1 | 11/2012 | Neelamani et al. |
| 2012/0290214 A1 | 11/2012 | Huo et al. |
| 2012/0314538 A1 | 12/2012 | Washbourne et al. |
| 2012/0316790 A1 | 12/2012 | Washbourne et al. |
| 2012/0316844 A1 | 12/2012 | Shah et al. |
| 2013/0081752 A1 | 4/2013 | Kurimura et al. |
| 2013/0135966 A1 | 5/2013 | Rommel et al. |
| 2013/0238246 A1 | 9/2013 | Krebs et al. |
| 2013/0311149 A1 | 11/2013 | Tang et al. |
| 2013/0311151 A1 | 11/2013 | Plessix |

FOREIGN PATENT DOCUMENTS

| | | |
|---|---|---|
| EP | 1 746 443 | 1/2007 |
| EP | 2 592 439 | 5/2013 |
| EP | 2 594 962 | 5/2013 |
| GB | 2 390 712 | 1/2004 |
| GB | 2 391 665 | 2/2004 |
| WO | WO 2006/037815 | 4/2006 |
| WO | WO 2007/046711 | 4/2007 |
| WO | WO 2008/042081 | 4/2008 |
| WO | WO 2008/123920 | 10/2008 |
| WO | WO 2009/067041 | 5/2009 |
| WO | WO 2009/117174 | 9/2009 |
| WO | WO 2011/040926 | 4/2011 |
| WO | WO 2011/091216 | 7/2011 |
| WO | WO 2011/093945 | 8/2011 |
| WO | WO 2012/024025 | 2/2012 |
| WO | WO 2012/041834 | 4/2012 |
| WO | WO 2012/047384 | 4/2012 |
| WO | WO 2012/083234 | 6/2012 |
| WO | WO 2012/134621 | 10/2012 |
| WO | WO 2012/170201 | 12/2012 |
| WO | WO 2013/081752 | 6/2013 |

OTHER PUBLICATIONS

Mora, P. (1989), "Inversion = migration + tomography," *Geophysics* 64, pp. 888-901.

Nazarian, S. et al. (1983), "Use of spectral analysis of surface waves method for determination of moduli and thickness of pavement systems," *Transport Res. Record* 930, pp. 38-45.

Neelamani, R., (2008), "Simultaneous sourcing without compromise," 70th Annual Int'l. Conf. and Exh., EAGE, 5 pgs.

Neelamani, R. (2009), "Efficient seismic forward modeling using simultaneous sources and sparsity," *SEG Expanded Abstracts*, pp. 2107-2111.

Nocedal, J. et al. (2006), *"Numerical Optimization, Chapt. 7—Large-Scale Unconstrained Optimization,"* Springer, New York, 2nd Edition, pp. 165-176.

Nocedal, J. et al. (2000), "Numerical Optimization-Calculating Derivatives," Chapter 8, Springer Verlag, pp. 194-199.

Ostmo, S. et al. (2002), "Finite-difference iterative migration by linearized waveform inversion in the frequency domain," SEG Int'l. Expo. & 72$^{nd}$ Ann. Meeting, 4 pgs.

Park, C.B. et al. (1999), "Multichannel analysis of surface waves," *Geophysics* 64(3), pp. 800-808.

Park, C.B. et al. (2007), "Multichannel analysis of surface waves (MASW)—active and passive methods," *The Leading Edge*, pp. 60-64.

Pica, A. et al. (2005), "3D Surface-Related Multiple Modeling, Principles and Results," 2005 SEG Ann. Meeting, *SEG Expanded Abstracts* 24, pp. 2080-2083.

Plessix, R.E. et al. (2004), "Frequency-domain finite-difference amplitude preserving migration," *Geophys. J. Int.* 157, pp. 975-987.

Porter, R.P. (1989), "Generalized holography with application to inverse scattering and inverse source problems," In E. Wolf, editor, Progress in Optics XXVII, Elsevier, pp. 317-397.

Pratt, R.G. et al. (1998), "Gauss-Newton and full Newton methods in frequency-space seismic waveform inversion," *Geophys. J. Int.* 133, pp. 341-362.

Pratt, R.G. (1999), "Seismic waveform inversion in the frequency domain, Part 1: Theory and verification in a physical scale model," *Geophysics* 64, pp. 888-901.

Rawlinson, N. et al. (2008), "A dynamic objective function technique for generating multiple solution models in seismic tomography," *Geophys. J. Int.* 178, pp. 295-308.

Rayleigh, J.W.S. (1899), "On the transmission of light through an atmosphere containing small particles in suspension, and on the origin of the blue of the sky," Phil. Mag. 47, pp. 375-384.

(56) References Cited

OTHER PUBLICATIONS

Romero, L.A. et al. (2000), Phase encoding of shot records in prestack migration, *Geophysics* 65, pp. 426-436.
Ronen S. et al. (2005), "Imaging Downgoing waves from Ocean Bottom Stations," *SEG Expanded Abstracts*, pp. 963-967.
Routh, P. et al. (2011), "Encoded Simultaneous Source Full-Wavefield Inversion for Spectrally-Shaped Marine Streamer Data," SEG San Antonio 2011 Ann. Meeting, pp. 2433-2438.
Ryden, N. et al. (2006), "Fast simulated annealing inversion of surface waves on pavement using phase-velocity spectra," *Geophysics* 71(4), pp. R49-R58.
Sambridge, M.S. et al. (1991), "An Alternative Strategy for Non-Linear Inversion of Seismic Waveforms," *Geophysical Prospecting* 39, pp. 723-736.
Schoenberg, M. et al. (1989), "A calculus for finely layered anisotropic media," *Geophysics* 54, pp. 581-589.
Schuster, G.T. et al. (2010), "Theory of Multisource Crosstalk Reduction by Phase-Encoded Statics," SEG Denver 2010 Ann. Meeting, pp. 3110-3114.
Sears, T.J. et al. (2008), "Elastic full waveform inversion of multi-component OBC seismic data," *Geophysical Prospecting* 56, pp. 843-862.
Sheen, D-H. et al. (2006), "Time domain Gauss-Newton seismic waveform inversion in elastic media," Geophysics J. Int. 167, pp. 1373-1384.
Shen, P. et al. (2003), "Differential semblance velocity analysis by wave-equation migration," $73^{rd}$ Ann. Meeting of Society of Exploration Geophysicists, 4 pgs.
Sheng, J. et al. (2006), "Early arrival waveform tomography on near-surface refraction data," *Geophysics* 71, pp. U47-U57.
Sheriff, R.E.et al. (1982), "*Exploration Seismology*", pp. 134-135.
Shih, R-C. et al. (1996), "Iterative pre-stack depth migration with velocity analysis," *Terrestrial, Atmospheric & Oceanic Sciences* 7(2), pp. 149-158.
Shin, C. et al. (2001), "Waveform inversion using a logarithmic wavefield," *Geophysics* 49, pp. 597-606.
Simard, P.Y. et al. (1990), "Vector Field Restoration by the Method of Convex Projections," *Computer Vision, Graphics and Image Processing* 52, pp. 360-385.
Sirgue, L. (2004), "Efficient waveform inversion and imaging: A strategy for selecting temporal frequencies," *Geophysics* 69, pp. 231-248.
Soubaras, R. et al. (2007), "Velocity model building by semblance maximization of modulated-shot gathers," *Geophysics* 72(5), pp. U67-U73.
Spitz, S. (2008), "Simultaneous source separation: a prediction-subtraction approach," 78th Annual Int'l. Meeting, *SEG Expanded Abstracts*, pp. 2811-2815.
Stefani, J. (2007), "Acquisition using simultaneous sources," 69th Annual Conf. and Exh., *EAGE Extended Abstracts*, 5 pgs.
Symes, W.W. (2007), "Reverse time migration with optimal checkpointing," *Geophysics* 72(5), pp. p. SM213-SM221.
Symes, W.W. (2009), "Interface error analysis for numerical wave propagation," *Compu. Geosci.* 13, pp. 363-371.
Tang, Y. (2008), "Wave-equation Hessian by phase encoding," *SEG Expanded Abstracts* 27, pp. 2201-205.
Tang, Y. (2009), "Target-oriented wave-equation least-squares migration/inversion with phase-encoded Hessian," *Geophysics* 74, pp. WCA95-WCA107.
Tang, Y. et al. (2010), "Preconditioning full waveform inversion with phase-encoded Hessian," *SEG Expanded Abstracts* 29, pp. 1034-1037.
Tarantola, A. (1986), "A strategy for nonlinear elastic inversion of seismic reflection data," *Geophysics* 51(10), pp. 1893-1903.
Tarantola, A. (1988), "Theoretical background for the inversion of seismic waveforms, including elasticity and attenuation," *Pure and Applied Geophysics* 128, pp. 365-399.
Tarantola, A. (2005), "Inverse Problem Theory and Methods for Model Parameter Estimation," *SIAM*, pp. 79.
Tarantola, A. (1984), "Inversion of seismic reflection data in the acoustic approximation," *Geophysics* 49, pp. 1259-1266.
Trantham, E.C. (1994), "Controlled-phase acquisition and processing," *SEG Expanded Abstracts* 13, pp. 890-894.
Tsvankin, I. (2001), "Seismic Signatures and Analysis of Reflection Data in Anisotropic Media," Elsevier Science, p. 8.
Valenciano, A.A. (2008), "Imaging by Wave-Equation Inversion," A Dissertation, Stanford University, 138 pgs.
van Groenestijn, G.J.A. et al. (2009), "Estimating primaries by sparse inversion and application to near-offset reconstruction," *Geophyhsics* 74(3), pp. A23-A28.
van Manen, D.J. (2005), "Making wave by time reversal," SEG International Exposition and $75^{th}$ Annual Meeting, *Expanded Abstracts*, pp. 1763-1766.
Verschuur, D.J. (2009), Target-oriented, least-squares imaging of blended data, 79th Annual Int'l. Meeting, *SEG Expanded Abstracts*, pp. 2889-2893.
Verschuur, D.J. et al. (1992), "Adaptive surface-related multiple elimination," *Geophysics* 57(9), pp. 1166-1177.
Verschuur, D.J. (1989), "Wavelet Estimation by Prestack Multiple Elimination," *SEG Expanded Abstracts* 8, pp. 1129-1132.
Versteeg, R. (1994), "The Marmousi experience: Velocity model determination on a synthetic complex data set," *The Leading Edge*, pp. 927-936.
Vigh, D. et al. (2008), "3D prestack plane-wave, full-waveform inversion," *Geophysics* 73(5), pp. VE135-VE144.
Wang, Y. (2007), "Multiple prediction through inversion: Theoretical advancements and real data application," Geophysics 72(2), pp. V33-V39.
Wang, K. et al. (2009), "Simultaneous full-waveform inversion for source wavelet and earth model," SEG Int'l. Expo. & Ann. Meeting, Expanded Abstracts, pp. 2537-2541.
Weglein, A.B. (2003), "Inverse scattering series and seismic exploration," Inverse Problems 19, pp. R27-R83.
Wong, M. et al. (2010), "Joint least-squares inversion of up- and down-going signal for ocean bottom data sets," *SEG Expanded Abstracts* 29, pp. 2752-2756.
Wu R-S. et al. (2006), "Directional illumination analysis using beamlet decomposition and propagation," *Geophysics* 71(4), pp. S147-S159.
Xia, J. et al. (2004), "Utilization of high-frequency Rayleigh waves in near-surface geophysics," *The Leading Edge*, pp. 753-759.
Xie, X. et al. (2002), "Extracting angle domain information from migrated wavefield," *SEG Expanded Abstracts* 21, pp. 1360-1363.
Xie, X.-B. et al. (2006), "Wave-equation-based seismic illumination analysis," *Geophysics* 71(5), pp. S169-S177.
Yang, K. et al. (2000), "Quasi-Orthogonal Sequences for Code-Division Multiple-Access Systems," *IEEE Transactions on Information Theory* 46(3), pp. 982-993.
Yoon, K. et al. (2004), "Challenges in reverse-time migration," *SEG Expanded Abstracts* 23, pp. 1057-1060.
Young, J. et al. (2011), "An application of random projection to parameter estimation in partial differential equations," SIAM, 20 pgs.
Zhang, Y. (2005), "Delayed-shot 3D depth migration," *Geophysics* 70, pp. E21-E28.
Ziolkowski, A. (1991), "Why don't we measure seismic signatures?," *Geophysics* 56(2), pp. 190-201.
U.S. Appl. No. 14/272,020, filed May 7, 2014, Wang et al.
U.S. Appl. No. 14/286,107, filed May 23, 2014, Hu et al.
U.S. Appl. No. 14/311,945, filed Jun. 20, 2014, Bansal et al.
U.S. Appl. No. 14/329,431, filed Jul. 11, 2014, Krohn et al.
U.S. Appl. No. 14/330,767, filed Jul. 14, 2014, Tang et al.
Abt, D.L. et al. (2010), "North American lithospheric discontinuity structured imaged by Ps and Sp receiver functions", *J. Geophys. Res.*, 24 pgs.
Akerberg, P., et al. (2008), "Simultaneous source separation by sparse radon transform," 78th SEG Annual International Meeting, *Expanded Abstracts*, pp. 2801-2805.
Aki, K. et al. (1980), "Quantitative Seismology: Theory and Methods Volume I—Chapter 7—Surface Waves in a Vertically Heterogenous Medium," W.H. Freeman and Co., pp. 259-318.

(56) References Cited

OTHER PUBLICATIONS

Aki, K. et al. (1980), "Quantitative Seismology: Theory and Methods Volume I," W.H. Freeman and Co., p. 173.
Aki et al. (1980), "Quantitative Seismology, Theory and Methods," Chapter 5.20, W.H. Freeman & Co., pp. 133-155.
Amundsen, L. (2001), "Elimination of free-surface related multiples without need of the source wavelet," *Geophysics* 60(1), pp. 327-341.
Anderson, J.E. et al. (2008), "Sources Near the Free-Surface Boundary: Pitfalls for Elastic Finite-Difference Seismic Simulation and Multi-Grid Waveform Inversion," 70th EAGE Conf. & Exh., 4 pgs.
Barr, F.J. et al. (1989), "Attenuation of Water-col. Reverberations Using Pressure and Velocity Detectors in a Water-Bottom Cable," 59th Annual SEG meeting, *Expanded Abstracts*, pp. 653-656.
Baumstein, A. et al. (2009), "Scaling of the Objective Function Gradient for Full Wavefield Inversion," SEG Houston 2009 Int'l. Expo and Annual Meeting, pp. 224-2247.
Beasley, C. (2008), "A new look at marine simultaneous sources," *The Leading Edge* 27(7), pp. 914-917.
Beasley, C. (2012), "A 3D simultaneous source field test processed using alternating projections: a new active separation method," *Geophsyical Prospecting* 60, pp. 591-601.
Beaty, K.S. et al. (2003), "Repeatability of multimode Rayleigh-wave dispersion studies," *Geophysics* 68(3), pp. 782-790.
Beaty, K.S. et al. (2002), "Simulated annealing inversion of multimode Rayleigh wave dispersion waves for geological structure," *Geophys. J. Int.* 151, pp. 622-631.
Becquey, M. et al. (2002), "Pseudo-Random Coded Simultaneous Vibroseismics," SEG Int'l. Exposition and 72th Annl. Mtg., 4 pgs.
Ben-Hadj-Ali, H. et al. (2009), "Three-dimensional frequency-domain full waveform inversion with phase encoding," *SEG Expanded Abstracts*, pp. 2288-2292.
Ben-Hadj-Ali, H. et al. (2011), "An efficient frequency-domain full waveform inversion method using simultaneous encoded sources," *Geophysics* 76(4), pp. R109-R124.
Benitez, D. et al. (2001), "The use of the Hilbert transform in ECG signal analysis," *Computers in Biology and Medicine* 31, pp. 399-406.
Berenger, J-P. (1994), "A Perfectly Matched Layer for the Absorption of Electromagnetic Waves," *J. of Computational Physics* 114, pp. 185-200.
Berkhout, A.J. (1987), "Applied Seismic Wave Theory," Elsevier Science Publishers, p. 142.
Berkhout, A.J. (1992), "Areal shot record technology," *Journal of Seismic Exploration* 1, pp. 251-264.
Berkhout, A.J. (2008), "Changing the mindset in seismic data acquisition," *The Leading Edge* 27(7), pp. 924-938.
Beylkin, G. (1985), "Imaging of discontinuities in the inverse scattring problem by inversion of a causal generalized Radon transform," *J Math. Phys.* 26, pp. 99-108.
Biondi, B. (1992), "Velocity estimation by beam stack," *Geophysics* 57(8), pp. 1034-1047.
Bonomi, E. et al. (2006), "Wavefield Migration plus Monte Carlo Imaging of 3D Prestack Seismic Data," *Geophysical Prospecting* 54, pp. 505-514.
Boonyasiriwat, C. et al. (2010), 3D Multisource Full-Waveform using Dynamic Random Phase Encoding, SEG Denver 2010 Annual Meeting, pp. 1044-1049.
Boonyasiriwat, C. et al. (2010), 3D Multisource Full-Waveform using Dynamic Random Phase Encoding, SEG Denver 2010 Annual Meeting, pp. 3120-3124.
Bunks, C., et al. (1995), "Multiscale seismic waveform inversion," *Geophysics* 60, pp. 1457-1473.
Burstedde, G. et al. (2009), "Algorithmic strategies for full waveform inversion: 1D experiments," *Geophysics* 74(6), pp. WCC17-WCC46.
Chavent, G. et al. (1999), "An optimal true-amplitude least-squares prestack depth-migration operator," *Geophysics* 64(2), pp. 508-515.

Choi, Y. et al. (2011), "Application of encoded multisource waveform inversion to marine-streamer acquisition based on the global correlation," 73rd EAGE Conference, *Abstract*, pp. F026.
Choi, Y et al. (2012), "Application of multi-source waveform inversion to marine stream data using the global correlation norm," *Geophysical Prospecting* 60, pp. 748-758.
Clapp, R.G. (2009), "Reverse time migration with random boundaries," SEG International Exposition and Meeting, *Expanded Abstracts*, pp. 2809-2813.
Dai, W. et al. (2010), "3D Multi-source Least-squares Reverse Time Migration," SEG Denver 2010 Annual Meeting, pp. 3120-3124.
Delprat-Jannuad, F. et al. (2005), "A fundamental limitation for the reconstruction of impedance profiles from seismic data," *Geophysics* 70(1), pp. R1-R14.
Dickens, T.A. et al. (2011), RTM angle gathers using Poynting vectors, *SEG Expanded Abstracts* 30, pp. 3109-3113.
Donerici, B. et al. (1005), "Improved FDTD Subgridding Algorithms Via Digital Filtering and Domain Overriding," *IEEE Transactions on Antennas and Propagation* 53(9), pp. 2938-2951.
Downey, N. et al. (2011), "Random-Beam Full-Wavefield Inversion," 2011 San Antonio Annual Meeting, pp. 2423-2427.
Dunkin, J W et al. (1973), "Effect of Normal Moveout on a Seismic Pluse," *Geophysics* 38(4), pp. 635-642.
Dziewonski A. et al. (1981), "Preliminary Reference Earth Model", *Phys. Earth Planet. Int.* 25(4), pp. 297-356.
Ernst, F.E. et al. (2000), "Tomography of dispersive media," *J Acoust. Soc. Am* 108(1), pp. 105-116.
Ernst, F.E. et al. (2002), "Removal of scattered guided waves from seismic data," *Geophysics* 67(4), pp. 1240-1248.
Esmersoy, C. (1990), "Inversion of P and SV waves from multicomponent offset vertical seismic profiles", *Geophysics* 55(1), pp. 39-50.
Etgen, J.T. et al. (2007), "Computational methods for large-scale 3D acoustic finite-difference modeling: A tutorial," *Geophysics* 72(5), pp. SM223-SM230.
Fallat, M.R. et al. (1999), "Geoacoustic inversion via local, global, and hybrid algorithms," *Journal of the Acoustical Society of America* 105, pp. 3219-3230.
Fichtner, A. et al. (2006), "The adjoint method in seismology I. Theory," *Physics of the Earth and Planetary Interiors* 157, pp. 86-104.
Forbriger, T. (2003), "Inversion of shallow-seismic wavefields: I. Wavefield transformation," *Geophys. J Int.* 153, pp. 719-734.
Gao, H. et al. (2008), "Implementation of perfectly matched layers in an arbitrary geometrical boundary for leastic wave modeling," *Geophysics J. Int.* 174, pp. 1029-1036.
Gibson, B. et al. (1984), "Predictive deconvolution and the zero-phase source," *Geophysics* 49(4), pp. 379-397.
Godfrey, R. J. et al. (1998), "Imaging the Foiaven Ghost," *SEG Expanded Abstracts*, 4 pgs.
Griewank, A. (1992), "Achieving logarithmic growth of temporal and spatial complexity in reverse automatic differentiation," 1 *Optimization Methods and Software*, pp. 35-54.
Griewank, A. (2000), Evaluating Derivatives: Principles and Techniques of Algorithmic Differentiation, Society for Industrial and Applied Mathematics, 49 pgs.
Griewank, A. et al. (2000), "Algorithm 799: An implementation of checkpointing for the reverse or adjoint mode of computational differentiation," 26 *ACM Transactions on Mathematical Software*, pp. 19-45.
Griewank, A. et al. (1996), "Algorithm 755: A package for the automatic differentiation of algorithms written in C/C++," *ACM Transactions on Mathematical Software* 22(2), pp. 131-167.
Haber, E. et al. (2010), "An effective method for parameter estimation with PDE constraints with multiple right hand sides," Preprint—UBC http://www.math.ubc.ca/~haber/pubs/PdeOptStochV5.pdf.
Hampson, D.P. et al. (2005), "Simultaneous inversion of pre-stack seismic data," SEG 75th Annual Int'l. Meeting, *Expanded Abstracts*, pp. 1633-1637.
Heinkenschloss, M. (2008), :"Numerical Solution of Implicity Constrained Optimization Problems," CAAM Technical Report TR08-05, 25 pgs.

(56) References Cited

OTHER PUBLICATIONS

Helbig, K. (1994), "Foundations of Anisotropy for Exploration Seismics," Chapter 5, pp. 185-194.
Herrmann, F.J. (2010), "Randomized dimensionality reduction for full-waveform inversion," *EAGE abstract* G001, EAGE Barcelona meeting, 5 pgs.
Holschneider, J. et al. (2005), "Characterization of dispersive surface waves using continuous wavelet transforms," *Geophys. J. Int.* 163, pp. 463-478.
Hu, L.Z. et al. (1987), "Wave-field transformations of vertical seismic profiles," *Geophysics* 52, pp. 307-321.
Huang, Y. et al. (2012), "Multisource least-squares migration of marine streamer and land data with frequency-division encoding," *Geophysical Prospecting* 60, pp. 663-680.
Igel, H. et al. (1996), "Waveform inversion of marine reflection seismograms for P impedance and Poisson's ratio," *Geophys. J. Int.* 124, pp. 363-371.
Ikelle, L.T. (2007), "Coding and decoding: Seismic data modeling, acquisition, and processing," 77th Annual Int'l. Meeting, SEG Expanded Abstracts, pp. 66-70.
Jackson, D.R. et al. (1991), "Phase conjugation in underwater acoustics," *J. Acoust. Soc. Am.* 89(1), pp. 171-181.
Jing, X. et al. (2000), "Encoding multiple shot gathers in prestack migration," *SEG International Exposition and 70$^{th}$ Annual Meeting Expanded Abstracts*, pp. 786-789.
Kennett, B.L.N. (1991), "The removal of free surface interactions from three-component seismograms", *Geophys. J. Int.* 104, pp. 153-163.
Kennett, B.L.N. et al. (1988), "Subspace methods for large inverse problems with multiple parameter classes," *Geophysical J.* 94, pp. 237-247.
Krebs, J.R. (2008), "Fast Full-wavefield seismic inversion using encoded sources," *Geophysics* 74(6), pp. WCC177-WCC188.
Krohn, C.E. (1984), "Geophone ground coupling," *Geophysics* 49(6), pp. 722-731.
Kroode, F.T. et al. (2009), "Wave Equation Based Model Building and Imaging in Complex Settings," OTC 20215, 2009 Offshore Technology Conf., Houston, TX, May 4-7, 2009, 8 pgs.
Kulesh, M. et al. (2008), "Modeling of Wave Dispersion Using Continuous Wavelet Transforms II: Wavelet-based Frequency-velocity Analysis," *Pure Applied Geophysics* 165, pp. 255-270.
Lancaster, S. et al. (2000), "Fast-track 'colored' inversion," 70$^{th}$ SEG Ann. Meeting, *Expanded Abstracts*, pp. 1572-1575.
Lazaratos, S. et al. (2009), "Inversion of Pre-migration Spectral Shaping," 2009 SEG Houston Int'l. Expo. & Ann. Meeting, *Expanded Abstracts*, pp. 2383-2387.
Lazaratos, S. (2006), "Spectral Shaping Inversion for Elastic and Rock Property Estimation," *Research Disclosure*, Issue 511, pp. 1453-1459.
Lazaratos, S. et al. (2011), "Improving the convergence rate of full wavefield inversion using spectral shaping," *SEG Expanded Abstracts* 30, pp. 2428-2432.
Lecomte, I. (2008), "Resolution and illumination analyses in PSDM: A ray-based approach," The Leading Edge, pp. 650-663.
Lee, S. et al. (2010), "Subsurface parameter estimation in full wavefield inversion and reverse time migration," SEG Denver 2010 Annual Meeting, pp. 1065-1069.
Levanon, N. (1988), "Radar Principles," Chpt. 1, John Whiley & Sons, New York, pp. 1-18.
Liao, Q. et al. (1995), "2.5D full-wavefield viscoacoustic inversion," *Geophysical Prospecting* 43, pp. 1043-1059.
Liu, F. et al. (2007), "Reverse-time migration using one-way wavefield imaging condition," *SEG Expanded Abstracts* 26, pp. 2170-2174.
Liu, F. et al. (2011), "An effective imaging condition for reverse-time migration using wavefield decomposition," *Geophysics* 76, pp. S29-S39.
Maharramov, M. et al. (2007), "Localized image-difference wave-equation tomography," SEG Annual Meeting, *Expanded Abstracts*, pp. 3009-3013.
Malmedy, V. et al. (2009), "Approximating Hessians in unconstrained optimization arising from discretized problems," *Computational Optimization and Applications*, pp. 1-16.
Marcinkovich, C. et al. (2003), "On the implementation of perfectly matched layers in a three-dimensional fourth-order velocity-stress finite difference scheme," *J. of Geophysical Research* 108(B5), 2276.
Martin, G.S. et al. (2006), "Marmousi2: An elastic upgrade for Marmousi," *The Leading Edge*, pp. 156-166.
Meier, M.A. et al. (2009), "Converted wave resolution," Geophysics, 74(2):doi:10.1190/1.3074303, pp. Q1-Q16.
Moghaddam, P.P. et al. (2010), "Randomized full-waveform inversion: a dimenstionality-reduction approach," 80$^{th}$ SEG Ann. Meeting, *Expanded Abstracts*, pp. 977-982.
Mora, P. (1987), "Nonlinear two-dimensional elastic inversion of multi-offset seismic data," *Geophysics* 52, pp. 1211-1228.

* cited by examiner

SIMULTANEOUS SOURCING DURING BOTH SEISMIC ACQUISITION AND SEISMIC INVERSION

CROSS-REFERENCE TO RELATED APPLICATION

This application claims the benefit of U.S. Provisional Patent Application 61/869,292, filed Aug. 23, 2013, entitled SIMULTANEOUS SOURCING DURING BOTH SEISMIC ACQUISITION AND SEISMIC INVERSION, the entirety of which is incorporated by reference herein.

FIELD OF THE INVENTION

This disclosure relates generally to the field of geophysical prospecting and, more particularly, seismic data processing as used in hydrocarbon exploration. Specifically, the disclosure relates to a method for acquiring, at reduced seismic acquisition cost, data using simultaneous sources in the field, and then constructing pseudo source-records that better meet the requirements for using additional simultaneous sourcing for computer simulations or forward modeling as part of iterative inversion methods that update a subsurface model, such as FWI (Full Wavefield Inversion) or LSRTM (Least-Square Reverse Time Migration), with additional reduction in computational costs.

BACKGROUND OF THE INVENTION

Acquisition and then Separation

Simultaneous sourcing, also called blended sourcing, is an emerging seismic acquisition method for reducing acquisition costs and improving spatial sampling. Conventionally, surveys are acquired by locating a single point source or an array of point sources at a single source location, firing the sources at the same time and then recording the response for the time needed for the sources to finish firing followed by a listening time in which all returns from the subsurface target are recorded. Optionally, the firing of the sources can be repeated and multiple records can be recorded at the same location. Then, the source array is moved to another location, and the process is repeated. The cost of acquiring seismic data by this sequential method is related to the time needed to record each individual source location and the number of such locations, and this cost often limits the ability to record data at fine sampling. By firing one or more point sources at different source locations at the same time or at nearly the same time within the same data record, acquisition time and cost can be reduced and sampling increased. This may be referred to as simultaneous acquisition. Originally, when the method was introduced, the interfering sources were excited at exactly the same time or simultaneously. Today, the same term is also used for acquisition in which sources fire within the same time window as another source even though the firing of the sources is not simultaneous in time and differs by some time delay. Generally, the sources that fire at nearly the same time within the same short record form an extended spatial or areal array, with no expectation that the positions of the individual point sources are close together. The tradeoff with simultaneous acquisition is the need to mitigate the overlapping energy or crosstalk between the sources at different locations by a combination of source encoding in the field and by filtering and source separation techniques in processing. Conventional processing requires individual records for each source location and these must be extracted or separated from the recorded data records.

Simultaneous sourcing is most commonly used for vibroseis sources with long sweep functions, which can be easily encoded. With the vibroseis method, each individual vibrator can be driven by a sweep that differs in some manner from the sweeps for other vibrators within the array, for example using differences in the sweep phase, pseudorandom function, sweep rate, sweep frequency range, start time, etc. Some methods require multiple sweeps and multiple records per location for separation. In the special case that the number of sweeps is greater than or equal to the number of vibrators, then the individual source records can be almost perfectly extracted from the multiple combined records by applying an inverse filter as described for the HFVS method in Sallas, et al. (U.S. Pat. No. 5,721,710). With this and similar methods, it is critical that the sources and the receivers do not move during the multiple sweeps. This method gives high quality separated records, because the separation is well-posed; there are as many input records or sweeps as there are output records or separated seismograms. But because multiple sweeps are needed, the method is not efficient and costs are much higher than single-sweep methods. The tradeoff with doing a single sweep is that the separation is ill-posed, and there will be some residual crosstalk noise after extracting the source seismograms. The cross-talk problem is acerbated by the fact that the vibrators output or signature is imperfectly related to the desired pilot signal by distortion and the addition of harmonics and the actual signal is unknown. The cross talk noise is typically mitigated with an iterative data inversion and separation method (Neelamani, et al., U.S. Pat. No. 8,248,886) or by filtering (Huo et al., U.S. Patent Publication No. 2012/0290214).

Simultaneous sourcing can also be used for impulsive sources but there are fewer and less powerful methods to encode impulsive sources. There is little cost saving benefit for use of simultaneous sourcing for land acquisition with dynamite, but use of simultaneous sourcing for airguns in marine acquisition can be beneficial, especially for wide-azimuth acquisition. The use of random firing times for marine sources firing nearly simultaneously but located on different vessels was disclosed by Vaage (U.S. Pat. No. 6,906,981). More recently, simultaneous sourcing has been proposed for multiple vessel shooting of wide-azimuth (WAZ) marine surveys (Beasley et al., "A 3D simultaneous source field test processed using alternating projections: a new active separation method," *Geophysical Prospecting* 60, 591-601 (2012)). Simultaneous sourcing is the only way that finely spaced (e.g. 25-m) source points, can be acquired in a single pass of the streamers. Without simultaneous sourcing, multiple passes are required and the survey takes much longer and costs are significantly higher.

We illustrate one configuration for a WAZ marine survey, in FIG. 1 to show the benefit of simultaneous sourcing. The figure shows source line 123, which is traversed by a source boat, and receiver line 121, which is traversed by a boat pulling multiple streamers of hydrophones. Both boats move in parallel at the same speed, typically a minimum of 6 knots. In the figure, the first position of the boats are shown in black, and future positions are shown in grey. The source boat is fired at position 103 while the receiver boat is at position 101, and the response is recorded typically for about 10 s. During this 10 s, the boats are moving. A few seconds later, the source boat reaches the next shot point at 113, typically 20-40 m from the previous shot, and the receiver boat reaches position 111. To record wider azimuths, the receiver boat can make 4 passes of receiver line 121 while a source boat traverses source lines 123-126 in sequence. This is an expensive option, but can yield a fine source sampling for each source line, for example, a 25-m source interval. Alternatively, 4 source boats can be used, and the sources fired flip-flopping between lines. For example, a source can be fired at position 103, then at position 114, 135, 136, and then 143. If one of the sources fires in flip-flop mode every 25-m, then the source interval along each line (from 103 to 143) is 200 m, much coarser than the fine-spaced survey. It is not possible to shoot and record at a finer shot spacing, because by the time the full record is acquired, the boats have moved tens of meters along the sail lines. A finely spaced survey can be recorded with simultaneous shooting by firing all four sources within the same time record but with a small random delay or jitter in either the firing time or position. For example, the sources can be fired at positions 103, 104, 105, and 106 to form one record with overlapping source energy. Then for the next record, sources are fired at 113, 114, 115, and 116, etc.

The jitter is a form of encoding that allows the interference to be partially removed by filtering in processing. Since the boats are moving, a delay in firing time necessarily means a slight shift in the firing position around the nominal sourcing interval as determined by the speed of the vessel. Instead of requiring vessel-to-vessel time synchronization, it can be operationally simpler to implement random time delays by generating a "preplot" of sourcing positions along each line with random positional variations around the nominal source interval. During acquisition, each vessel shoots independently of the other vessels at the predetermined sourcing positions. With this method, the exact firing position but not the firing time is predetermined, but the result is still randomization in time. In the current invention, the randomization of sourcing time or position is understood to be equivalent. In either case, it is important to determine the actual firing position and firing time and these values along with other sourcing characteristics comprise the encoding function.

The combined data record obtained with simultaneous sourcing must be separated into individual records for each source for conventional processing. A flow-diagram of the standard process is shown in FIG. 2, and the process is illustrated in FIG. 3. In Step 201, source records of length $T_{record} > T_{listen}$ with multiple source excitations during the record are obtained. Some sort of field-encoding scheme such as jittered start times or position is used during the sourcing. $T_{listen}$ is the time needed for the energy to travel from the source to the target and then to the receiver. In FIG. 3, 304 is a simple illustration of a source record for a single-source. In these and subsequent diagrams, the response of a single source is illustrated with a linear event 302 and a hyperbolic event 303. In the simultaneous source record 309, the four sources fire with small time delays and a linear and hyperbolic event from each of the four sources interfere. We assume these 4 sources are at long crossline distances on the source lines 123-126 in FIG. 1, but only one boat and source are shown in the cross-section view of 309. Next in Step 202, the encoding functions, including the source positions and start times, are determined for the sources that contribute to the records. The source location and time projected onto the record window is indicated by the sunburst 301 for the single source. The corresponding source positional variation is relatively small compared to the scale of the figure and is not illustrated in the diagram. The simultaneous source record 309 is generated by sources at projected positions 305, 306, 307, and 308, each having a small time shift relative to each other. Then in Step 203, the encoding function is used to extract individual source records, one for each source starting at the firing time of that source and continuing for the appropriate listening time $T_{listen}$. For vibroseis data, this extraction can include the process of correlation by the particular sweep used for that source. In this marine example, the single record 309 is copied 4 times and then shifted in time so that the record starts (zero time) at the firing time for each respective source. For example, the record 315 is made by copying record 309 and time shifting to the time of source 305. Record 316 corresponds to source 306; record 317 corresponds to 307 and 318 corresponds to 308. This step is sometimes call pseudo-separation or pseudo-deblended. In this example, none of the interference noise has been removed at this stage. Next, in Step 204 further processing methods are used to filter the interfering energy that is not desired on each source gather, or to use a sparse inversion scheme to improve the separation of the data, resulting in a separated seismogram for each source as if it has been recorded independently of the other sources. Then in Step 205, the separated source gathers can be conventionally imaged or inverted.

The same processing method listed in FIG. 2 can also be used for recording on land or on the ocean bottom. With land or ocean-bottom data, it is now possible to record the response of receivers continuously. Wireless receivers contain memory and a clock and can record without stopping for weeks or months. During this time, the sources fire and their firing times are recorded. Multiple sources can be used and to reduce the acquisition time and cost, these source can fire so that the response overlap in time as show in FIG. 4A. FIG. 4A shows a single long continuous record 401 with multiple source excitations illustrated by sunbursts. Unlike the marine streamer case, the sources are not fired at small intervals compared to the record length, and thus conditions are not met for use of the term areal array. But as in the marine streamer case, the initial pseudo-separation Step 203 involves extracting windows the size of the desired record length $T_{listen}$ starting at the firing time of one of the sources as shown in FIG. 4B. For example a window corresponding to 412 starting at the source firing time 402 is copied and extracted to make source record 422. It has interfering energy from other sources at 433 and 424. Next a window 413 is copied and extracted for source 403 to make source record 423, and a window 414 is extracted for source 404 making source record 424, and so on.

Simultaneous sourcing followed by source separation can also be used to assist with computationally-expensive seismic data simulation or forward modeling as described in Neelamani et al. (U.S. Pat. No. 8,248,886). Such forward modeling is a component of seismic imaging or seismic inversion with the output being an image of reflectivity or of formation properties such as the seismic velocity of the subsurface. Forward modeling uses a detailed velocity model and computes the complex wavefields theoretically generated by each source. Considerable computer time can be saved by reducing the number of sources to be modeled at one time by using simultaneous sourcing with some sort of encoding scheme, and then separating the data into the individual source seismograms. This method is identical to the field acquisition, but there are more choices of encoding schemes when done in the computer, and the specific encoded-sequence for a source is perfectly known. One common encoding scheme is to use random scaling in which the output of each source is randomly multiplied by either plus or minus one. This scheme cannot be physically implemented in the field for impulse sources such as airguns or explosives.

As described above, simultaneous sourcing can be used to lower costs to acquire seismic data in the field or to simulate seismic data in the computer. This involves recording one or more composite records containing interference from multiple sources. This can be a short record with sources excited close together in time and forming a spatial source array. It also can be continuous long record with individual sources excited at random or fixed intervals. For conventional imaging and inversion, the composite record must be separated into individual source gathers. Typically, this involves pseudo-separation by extracting a window around the firing-time of the sources and then using filtering or inversion operations to remove interference noise or crosstalk. In the special case, that the number of records are the same or greater than the number of individual sources within a spatial array, the separation is quite good, but acquiring multiple records is expensive. With fewer records, there is a problem in that the separation is imperfect with some crosstalk noise remaining or important signal removed by the filtering or inversion.

Inversion without Separation

Simultaneous sourcing is also used to save computational cost associated with imaging and inversion of seismic data. In these methods, individual seismic source gathers that were acquired sequentially, i.e. one source or source array shot at a time, are encoded in the computer and summed to form a simultaneous source record that is then used to form an image of seismic reflectivity or to determine subsurface properties. Use of this method to increase the speed and reduce cost of conventional (non-iterative and does not improve a sub-surface model) migration is disclosed by Ober et al. (U.S. Pat. No. 6,021,094) and use of the method in inversion is disclosed by Krebs, et al. (U.S. Pat. No. 8,121,823). Crosstalk or interference between sources is also a problem for this use of simultaneous sourcing and such crosstalk manifests itself as noise in the imaging and inversion outputs. The crosstalk can be minimized somewhat by optimizing the computer encoding functions, such as using random scaling instead of phase rotation, but the results may not be as good as the more computer-intensive sequential use of individual sources.

Simultaneous sourcing is particularly useful for inversion, such as full waveform inversion (FWI) and least-square reverse-time migration (LSRTM). These methods, unlike traditional imaging, work to iteratively update a trial model to minimize a data misfit function. The model is either subsurface properties such as velocity for FWI, or the reflectivity for LSRTM. Note that the misfit function is computed without source separation. Since both the forward modeling and the model update method are compute intensive, simultaneous sourcing has a large advantage. Typically all the sources in the survey or all the sources in a swath or sail line are encoded and summed to make a very large simultaneous source array. To minimize the crosstalk noise and to improve the results, the sources can be re-encoded and re-summed every iteration and then used for a model update (Krebs, U.S. Pat. No. 8,121,823). Each group of encoded and summed data may be called a realization of the data. The best results and reduced crosstalk are achieved when multiple realizations are used in the iterative process.

A typical process for the use of simultaneous sourcing in inversion is shown in FIG. 5. In Step 501, a number of field records are obtained, each with the same spread extent $L_{spread}$ and record duration $T_{listen}$. The record duration $T_{listen}$ should include the time needed for seismic waves to travel from the source to the target and then to the receivers. A single source or areal array can be used for each record. The records are then computer encoded, preferably with a randomized encoding scheme in Step 502. For example, the records can be randomly multiplied by plus or minus 1 or phase rotated by a random factor. Then all the records in the sail line or swath or in the entire survey are summed or stacked, forming one simultaneous source record. This is called one realization of the data. Then in Step 503, the seismic response is simulated in the computer for traveltime $T_{listen}$ for all the sources at one time using the computer encoding scheme. This step uses an initial or updated model. The simulated and measured records are compared in Step 504, and the comparison or misfit function is used to update the subsurface image or property model. If multiple iterations (Step 506) are needed, it is preferable to go back to Step 502 and re-encode the field records, making a second realization of the data. By changing the encoding each iteration, artifacts and residual noise are reduced.

The use of simultaneous-sourcing for iterative inversion assumes that the receiver spread and record length are fixed, i.e. all receivers are recording for all sources for the same length of time so that the records can be summed together. The computer is used to forward-model all the sources into all of the receivers as if they were initiated at the same time or nearly the same time. If the point source data are not recorded with a fixed spread, for example if different receiver locations are used to record different shots, then the forward-modeling case does not match the field data case. This can create problems in that the misfit function, the difference between the field and forward-modeled data, will be dominated by the missing energy between the forward modeling and measured data and will not be useful for updating the trial model. Field data recorded by marine streamer is particularly problematic, in that the receiver steamer moves with the boat and is not fixed. A fixed spread is more commonly achieved on land or ocean-bottom recording, but even in this case a rolling-spread in which the active receiver lines change with source position may be acquired and not meet the assumptions of a fixed spread.

FIG. 6 illustrates the problem with acquiring data conventionally with a marine streamer and then using simultaneous sourcing to reduce the computation effort required in inversion. In 61, a source is fired at position 602 and a record 601 is captured. In this example, the boat then moves forward to position 604 and captures record 603 and then to location 606 for record 605. The receivers are moving so the actual receivers are at different locations along the source line. If all the traces are arranged by their true positions along the sail lines, encoded and summed, a simultaneous source gather 610 is obtained. Then, if the three sources (622, 623, 624, corresponding to 602, 604, and 606) are simultaneously excited in the computer, the simulated record 612 is obtained. There is an immediate mismatch between the measured and simulated data. The measured data do not include traces for receivers to the left of each source, nor do they measure the longer offsets. Thus events shown for the simulated data, for example 644 and 645 and 646, are missing in the measured data record 610. Several methods have been proposed for doing inversion in the case of the non-fixed spread including Rickett, et al. (U.S. Patent Publication No. 2012/0215506), who proposes separating the simulated data before computing the misfit, and Routh et al. (U.S. Patent Publication No. 2012/0143506) who proposes using the cross-correlation objective function. These two solutions are compromises that do not fully solve the problem. There can be errors in separating the data for the first approach, and the cross-correlation objective function is less sensitive to amplitude information in the data compared to the standard least-squares objective function.

Other published attempts to deal with the failure of the fixed-receiver assumption include (1). "Hybrid method for full waveform inversion using simultaneous and sequential source method," by Routh et al., U.S. Pat. No. 8,437,998; (2) "Simultaneous source encoding and source separation as a practical solution for full wavefield inversion," by Routh et al., U.S. Publication No. 2012/0073825; (3) "Orthogonal source and receiver encoding," by Krebs, et al., U.S. Publication No. 2013/0238246; (4) Haber et al., "An effective method for parameter estimation with PDE constraints with multiple right hand sides," Preprint—UBC at internet address http://www.math.ubc.ca/~haber/pubs/PdeOptStochV5.pdf (2010).

In this section, we have discussed generating the simultaneous source gather in the computer from data that were recorded sequentially in the field. Krebs, et al. (U.S. Pat. No. 8,121,823) taught that field encoded records that are acquired with an encoded areal source array recorded in a short record could be used in inversion as acquired, without the separation step discussed in the "Acquisition and then Separation" section of this document. By not separating the data, errors from the separation processes are not included in the inversion or imaging steps. Such errors could include a loss or deletion of certain reflection components that are important, for example steep dipping diffractions may be eliminated by error and limit the ability to sharply image bed terminations at small faults. There remains a problem, however, that certain powerful encoding methods available on the computer, such as random scaling, cannot be achieved in the field. In addition, if all the sources are acquired simultaneously in the field with one set of encoding functions, the encoding pattern is fixed and cannot be changed each iteration to make multiple realizations of the data. Finally, the requirements for using simultaneous sourcing for inversion are not always achieved when simultaneous sourcing is used in the field. It is a requirement as discussed above that the data be recorded with a fixed, non-moving spread of receivers for a fixed short length of time. The problems of moving spreads as illustrated above for marine sources is even worse when doing simultaneous sourcing in the field. In addition, it is not practical to use computer simulation to exactly simulate the data as acquired continuously by land wireless receivers for weeks, as illustrated in FIG. 4A. To be practical, the record length simulated in the computer should be short, on the order of a few seconds. No such record with a small group of sources recorded for a period of time while isolated from other sources can be extracted from record 4A.

The present invention uses simultaneous sourcing in the field in such a way as to overcome problems from non-fixed spreads and long recording times to yield a plurality of pseudo super-source records that can be computer encoded and stacked to make multiple realizations of the data that can be changed each iteration of the inversion.

SUMMARY OF THE INVENTION

This invention is a method for acquiring, at reduced seismic acquisition cost, data using simultaneous sources in the field, and then constructing pseudo source-records that better meet the requirements for using additional simultaneous sourcing for computer simulations or forward modeling as part of iterative inversion, such as FWI (Full Wavefield Inversion) or LSRTM (Least-Squares Reverse Time Migration), with additional reduction in computational costs. By better meeting the requirements of simultaneous sourcing for FWI or RTM, artifacts and crosstalk are reduced in the output. The method can be used for marine streamer acquisition and other non-fixed spread geometries to acquire both positive and negative offsets and to mitigate the "missing data" problem for simultaneous-source FWI. It can also be used for land data to overcome issues with moving spreads and long continuous records, where a long continuous record means a data record too long to be effectively computer simulated.

A first embodiment of the invention is a method for performing simultaneous inversion (without separation) of multiple sources where the data being inverted are field data records generated by two or more interfering or overlapping sources. Steps of this method may include:

(a) obtaining one or more field records generated by two or more sources using a field encoding scheme, wherein detected returns from sources interfere in time and space;

(b) selecting one or more operations from a group consisting of windowing, time shifting, padding time or traces, appending, and summing, then constructing a plurality of pseudo super-source records, each with the same spatial extent and time duration;

(c) identifying sources that contribute to each pseudo super-source record along with their position, firing time and encoding function;

(d) computer encoding each pseudo super-source record and stacking them to form a single measured simultaneous-source record;

(e) using a subsurface model, simulating in one forward modeling operation a response of the sum of all contributing sources using a combination of the field and computer encoding schemes to make a single simulated simultaneous-source record that predicts the measured simultaneous-source record;

(f) comparing the measured and simulated simultaneous-source records over a selected region of interest, and using the comparison to update the subsurface model; and (g) repeating (e)-(f) at least once using the updated subsurface model.

A second embodiment of the invention is an application of the first embodiment to data acquired under survey conditions in which the fixed-receiver assumption necessary for simultaneous-source inversion is not satisfied. Steps of this method may include:

(a) obtaining seismic data acquired in a survey by advancing a front source and a trailing rear source along a source line with a non-fixed spread of receivers, and activating each source at selected intervals along the source line, wherein every activation location for the rear source falls on a previous activation location for the front source, and wherein a selected field encoding is used for all source shots with the field encoding for the rear source always being the same as was previously applied to the front source at the same activation location, resulting in a series of shot records each simultaneously recording both sources but with each shot recorded by less than a full spread of receivers; and (b) processing the shot records by steps comprising:
 (i) constructing from the shot records a plurality of pseudo super-shot records, constructed such that each has data from a full spread of receivers;
 (ii) encoding each pseudo super-shot record and stacking to form a simultaneous-source record of measured data;

(iii) using a computer to simulate the simultaneous-source record of measured data, using the same encoding used in (ii) and also the field encoding, and using an assumed subsurface model of velocity or other physical property; and (iv) comparing the simulated simultaneous-source record with the simultaneous-source record of measured data, and determining from that an adjustment to the subsurface model of velocity or other physical property.

The above-described first embodiment of the invention may be used without the additional features of the second embodiment, for example when processing data where all sources illuminate a full spread of receivers. The updated or adjusted velocity model resulting from the present inventive method may be used to migrate the seismic data to generate an image of the subsurface, or for other seismic data processing and interpretation purposes relating to exploration for hydrocarbons.

BRIEF DESCRIPTION OF THE DRAWINGS

The present invention and its advantages will be better understood by referring to the following detailed description and the attached drawings in which:

Due to patent law restrictions on the use of color, FIG. 16 is a black-and-white reproduction of a color original. The invention will be described in connection with example embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the scope of the invention, as defined by the appended claims.

DETAILED DESCRIPTION OF EXAMPLE EMBODIMENTS

The invention is first described in its basic form, then specific embodiments for marine and land data are described. This invention uses simultaneous sourcing in the field in such a way as to enhance the ability to further use simultaneous sourcing in iterative inversion by reducing the effects of crosstalk noise and better approximating acquisition by a fixed spread of receivers. The invention constructs, from acquisition records, what may be called pseudo super-source (or super-shot) records, each with the same duration and spatial extent. Each pseudo super-source record contains recorded energy from multiple sources, each source energized with a field encoding scheme (e.g., random time shifts, random source positions, phase rotations, sweep function, or other method) and each record is constructed by the operations of windowing, time shifting, summing and appending the original field records. The survey is acquired in a manner that allows these pseudo super-shot records to be constructed so that the sources can be properly simulated simultaneously in a computer. In particular, seismic energy that would be generated by a synthetic source and recorded within a predetermined distance $D_{source}$ within the spread and time duration $T_{source}$ is represented within the measured pseudo super-shot record. This requirement may require some groups of source points to be repeated into different receiver spreads with the same encoding as previously used. The multiple super-shot records are then separately encoded in the computer, preferably with random scaling such as multiplying by randomly selected +1 or −1, and then summed and used for inversion or imaging. Preferably, the computer encoding scheme is changed in subsequent iterations of the inversion of the inversion or imaging.

Figure 7:
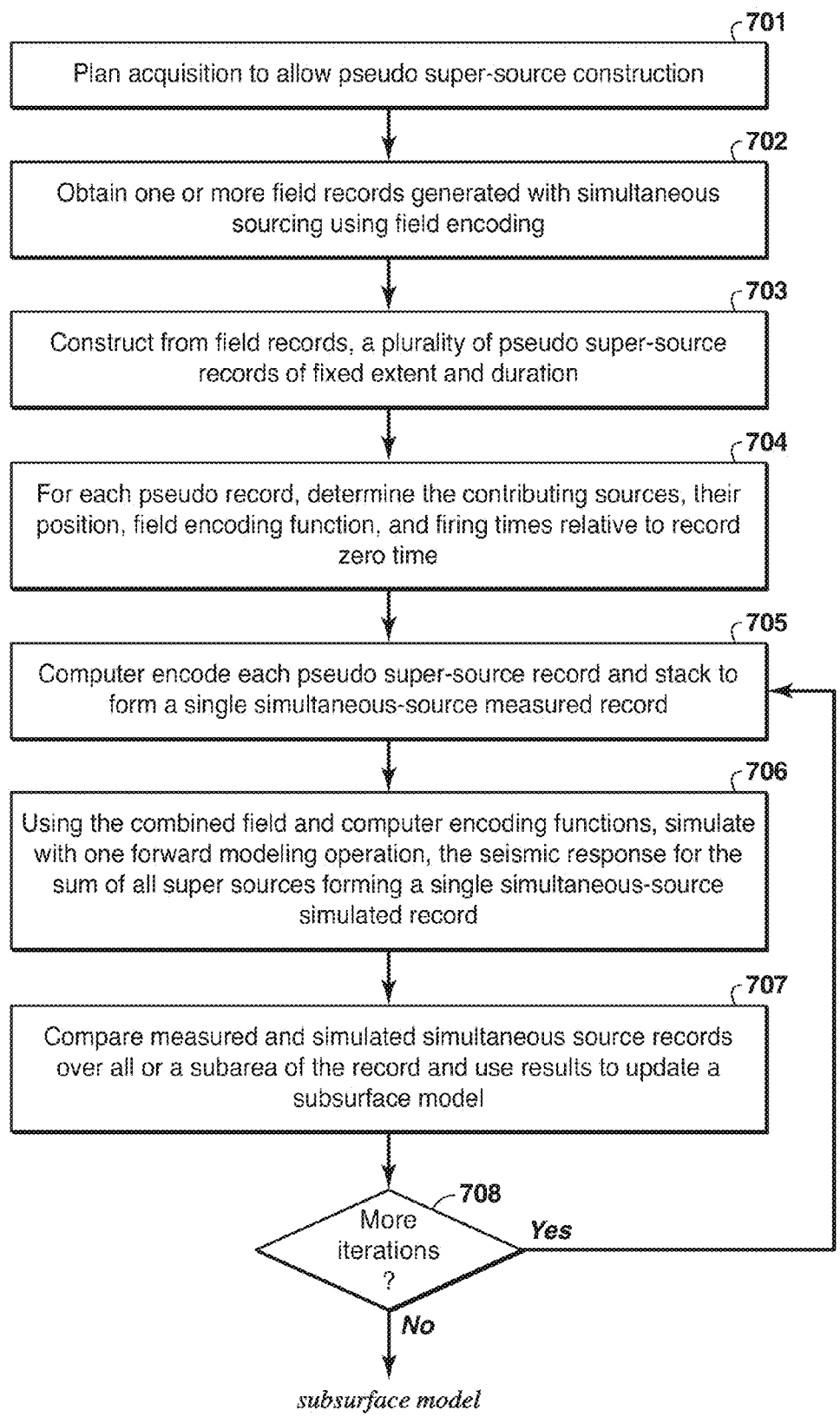
FIG. 7 is a flow chart showing basic steps in one embodiment of the present inventive method.

Basic steps in one embodiment of the present inventive method are given in the flow chart of FIG. 7. In Step 701, a seismic survey is planned including choosing the type of source and optimal number and spacing of desired sourcing locations and a field encoding scheme. The field encoding scheme can include any parameter related to the source excitation including its location, firing time, frequency components, source phase, etc. In addition, two parameters are selected: $T_{source}$ and $D_{source}$. $T_{source}$ is a time greater than or equal to $T_{listen}$ and, in addition, is a time long enough that the amplitude of that source is reduced to a level where it no longer provides substantial interference noise. Typically, $T_{source}$ may be selected to be equal to $T_{listen}$ unless a long continuous record such as FIG. 12 has been acquired. $D_{source}$ is related in that it is equal to or larger than the maximum offset distance of interest or equal to the distance by which the source amplitude is reduced so that it no longer provides substantial interference noise. These parameters are used to guide the acquisition and subsequent generation of pseudo records such that the pseudo records can be accurately simulated within a distance $D_{source}$ and time $T_{source}$ of any source location and firing time. Ideally the parameters are as small as possible while still large enough to include returns from the target. Smaller parameters mean less stringent requirements for the acquisition and construction of pseudo-gathers.

In Step 702, one or more field records are obtained that are generated with "simultaneous" sourcing so that energy from the different sources partially overlaps in time. In other words, the sources do not have to be activated exactly simultaneously, and the small time shifts between them are one way of performing the field encoding referred to in Step 702. A field record is typically all—or a subset—of the data recorded by the active receivers (moving or stationary) in one period of time, with a start time and a stop time and no gaps. The field records can be discrete records of a fixed time duration or they can be a single, continuous time record. If the recording spread is moved during acquisition, then preferably some of the source points within the distance $D_{source}$ of the boundary of the first spread are repeated into the second spread with the same encoding scheme previously used so that all energy within the distance $D_{source}$ is recorded on both sets of spread positions so they can be appended together.

Then in Step 703, a plurality of what may be called pseudo super-source records of fixed extent and duration are constructed. Preferably, the record extent would span the survey width, as if the survey had been recorded by a fixed spread of receivers the width of the survey, and the record duration would be at least as long as the time for seismic energy to propagate from the source to the target and to the receivers at the maximum useable distance or offset from the source. The construction process can include operations such as extractions of various time windows and trace regions from the field records. In addition, a pad of zero traces can be attached and a pad of time can be added before or after the windows. An objective of the construction of a pseudo super-source record is that every receiver location within an offset distance $D_{source}$ from the location of the source has appropriate data, i.e. data that would have been recorded if there had been a fixed receiver spread when the source shot occurred. Typically, the data from every field record will appear in at least one pseudo super-source record. The various windows can then be appended or summed together to form a pseudo super-shot record. Then in Step 704, each shot that influences or contributes to the region of interest is identified along with its field encoding function, and start time relative to the zero time of the pseudo super-shot record. The contributing or influential shots can be assumed to be those for which the source is excited within the distance $D_{source}$ and a time $T_{source}$ from the boundary of the region of interest. This information is combined with the computer-encoding function and used for the computer simulation step 706.

Next in Step 705, the different pseudo super-shot records are computer encoded, preferably, but not necessarily (any incoherent encoding scheme will work), by random scaling in which they are randomly multiplied by plus or minus one (±1). Then all the pseudo records are summed together to form one simultaneous source record. The computer is then used to compute the forward modeling simulation in one step for all the sources within the simultaneous record, which were identified in Step 704, as if all the sources had been fired simultaneously or nearly simultaneously (Step 706). (In other words, a wave propagation equation is solved with appropriate boundary and initial conditions and assuming a subsurface velocity model, using numerical methods such as iterative finite difference.) The computer simulation is made using the combined field and computer encoding schemes, i.e. what might be called double encoding. When simulating in Step 706 a simultaneous-source record corresponding to a simultaneous-source measured record from Step 705, the simultaneous-source simulated record is generated using a combination of the computer encoding that was used in step 705 combined with the field encoding from step 704/702. In Step 707, the recorded records from 703 and the simulated records from 706 are compared over a region of interest, and the results are used to update the subsurface model. If more iterations of the imaging or inversion is needed as determined in Step 708, then preferably the computer encoding Step 705 is repeated with a different encoding function.

Marine Embodiment

Figure 1:
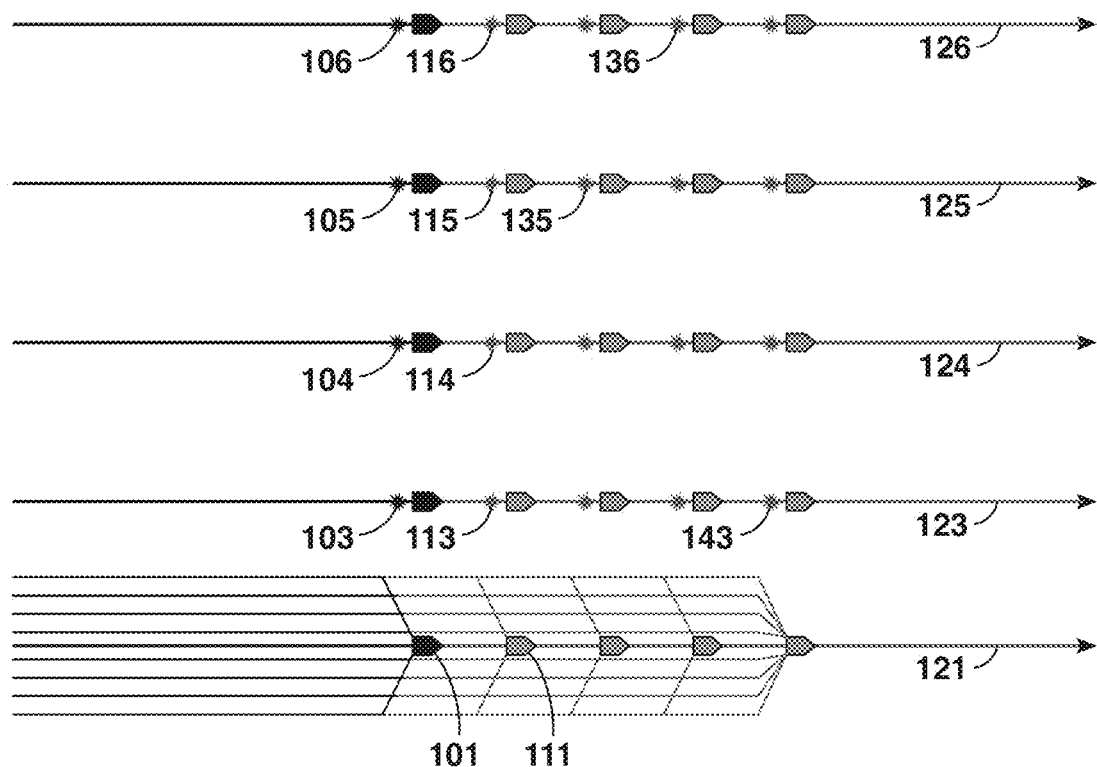
FIG. 1 is a schematic diagram of the positions of four source boats and a receiver streamer boat as they move to the right along predetermined lines for a conventional wide-azimuth acquisition survey.
Figure 2:
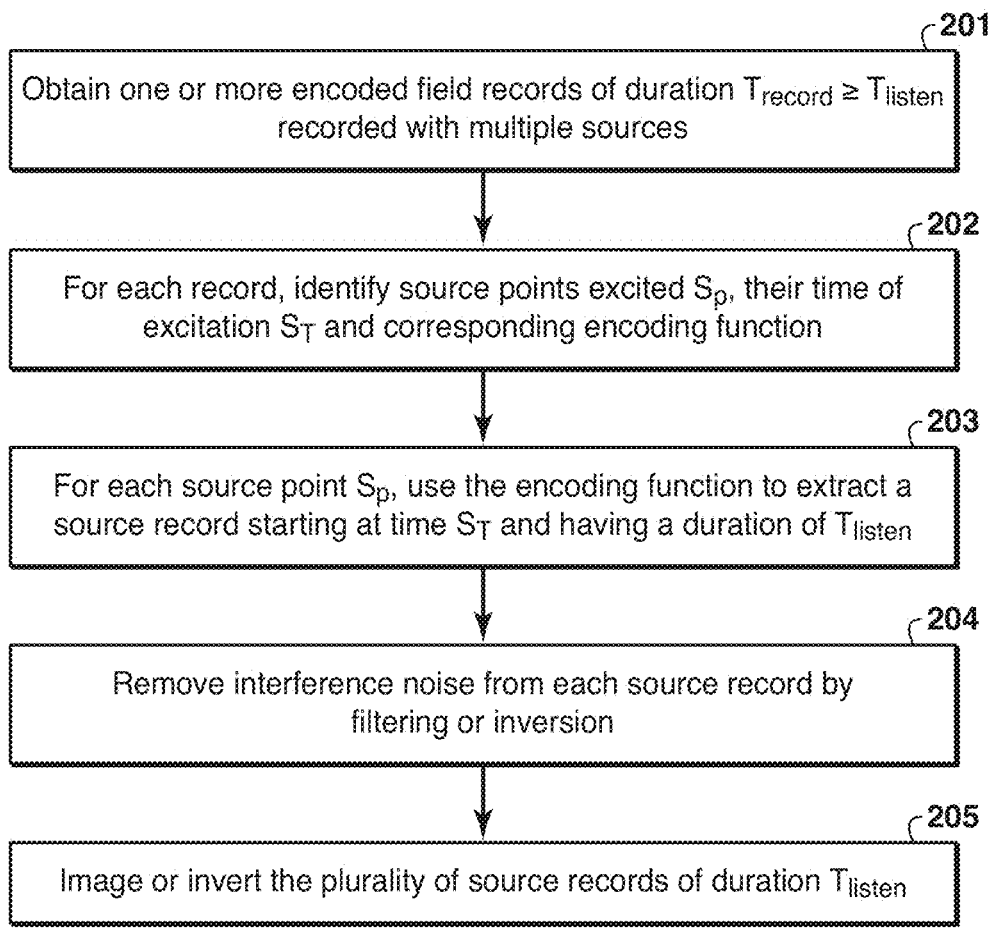
FIG. 2 is a flow chart of conventional steps used for processing data acquired with simultaneous encoded sourcing in the field and then separated in processing.
Figure 3:
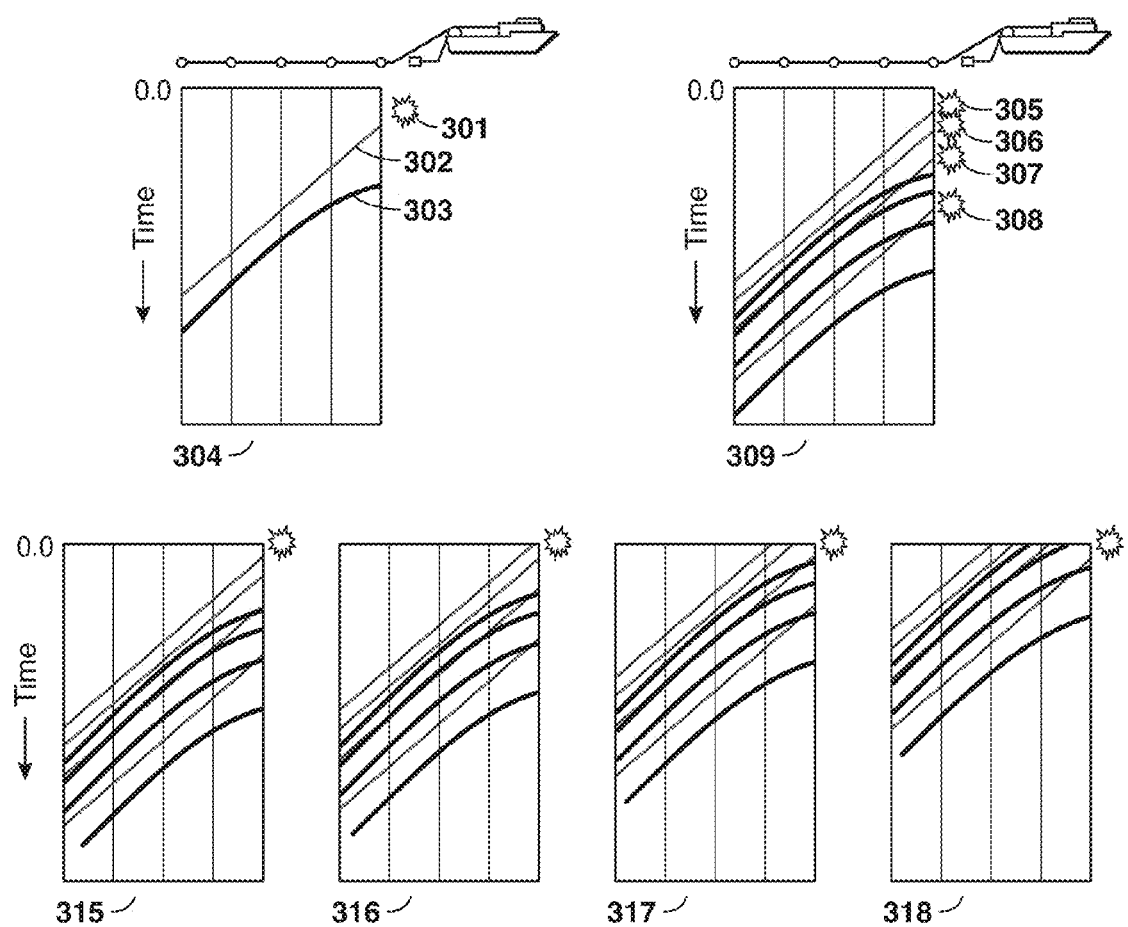
FIG. 3 is an illustration of seismic records acquired for marine data with simultaneous encoded sourcing according to FIG. 1, followed by the source separation method of FIG. 2.
Figure 4A:
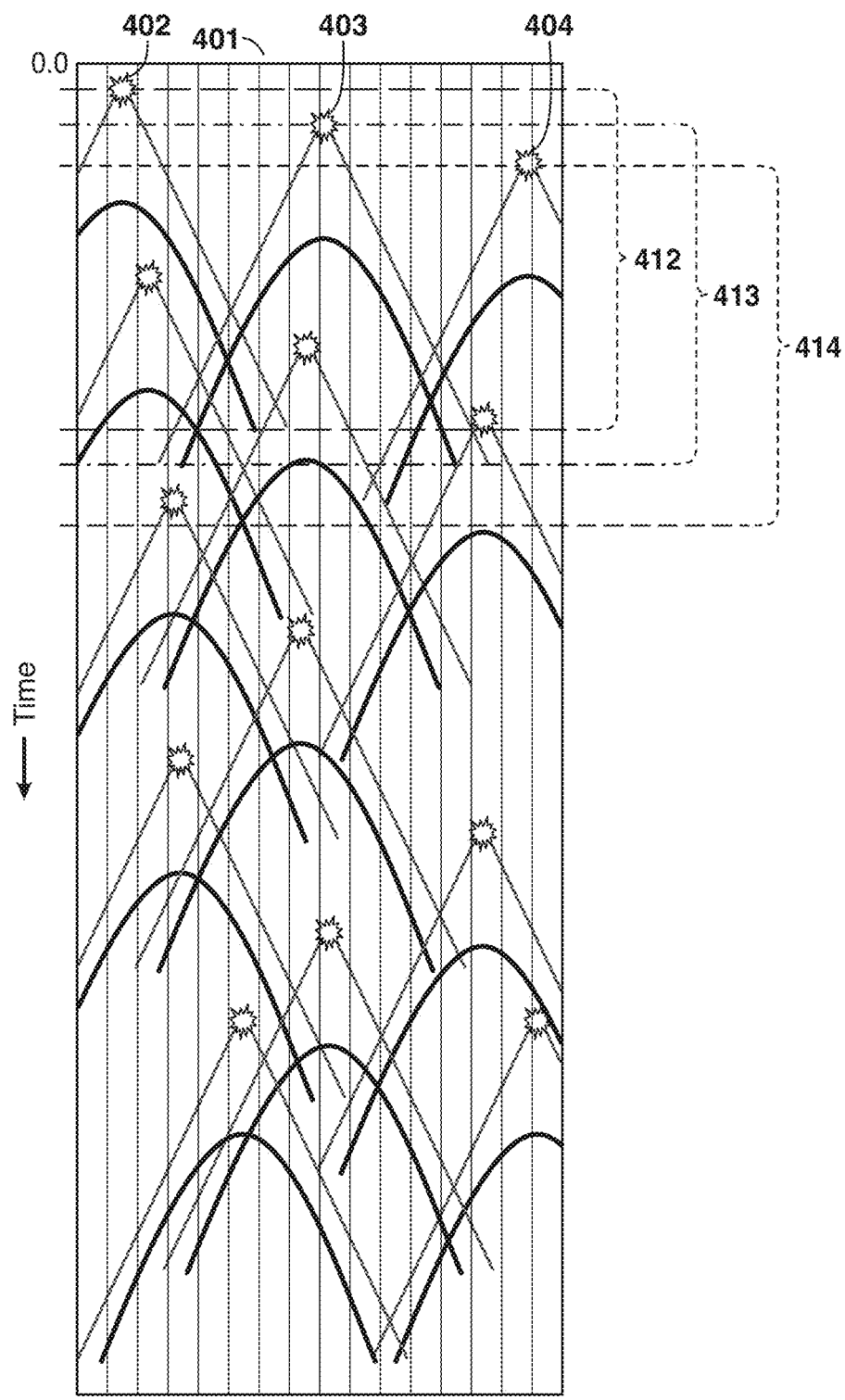
FIGS. 4A-4B illustrate a seismic record acquired with simultaneous encoded sourcing for land (4A) and then separated into source gathers (4B) according to the method of FIG. 2.
Figure 4B:
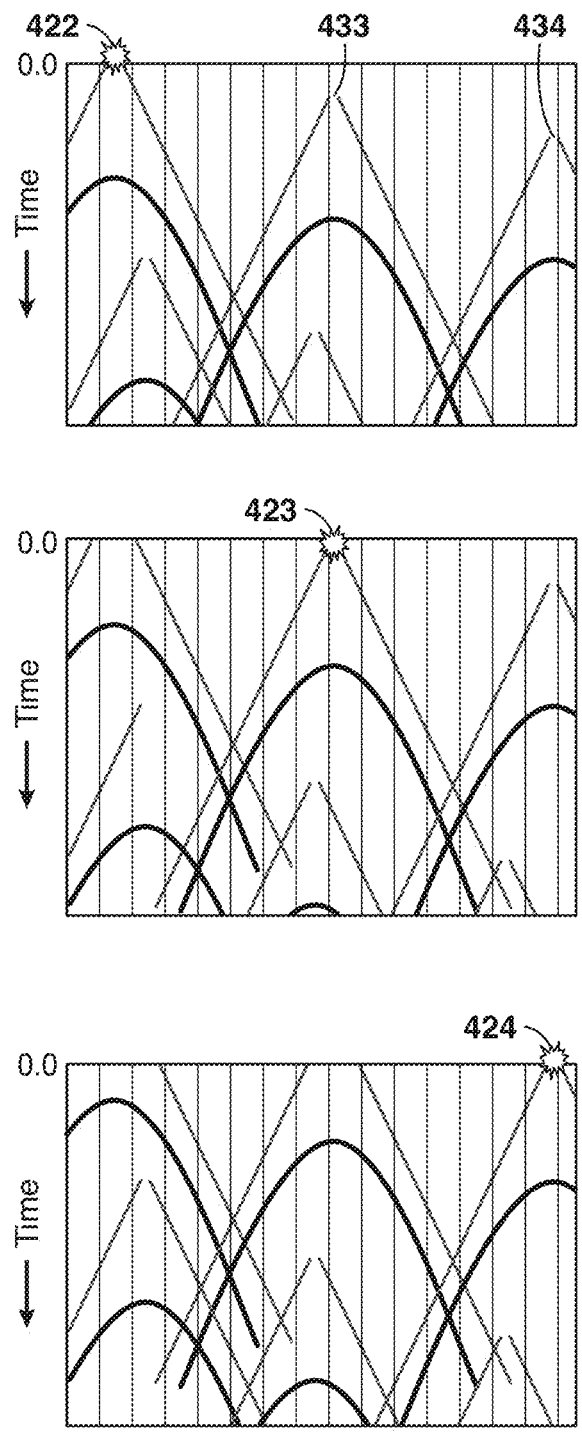
Figure 5:
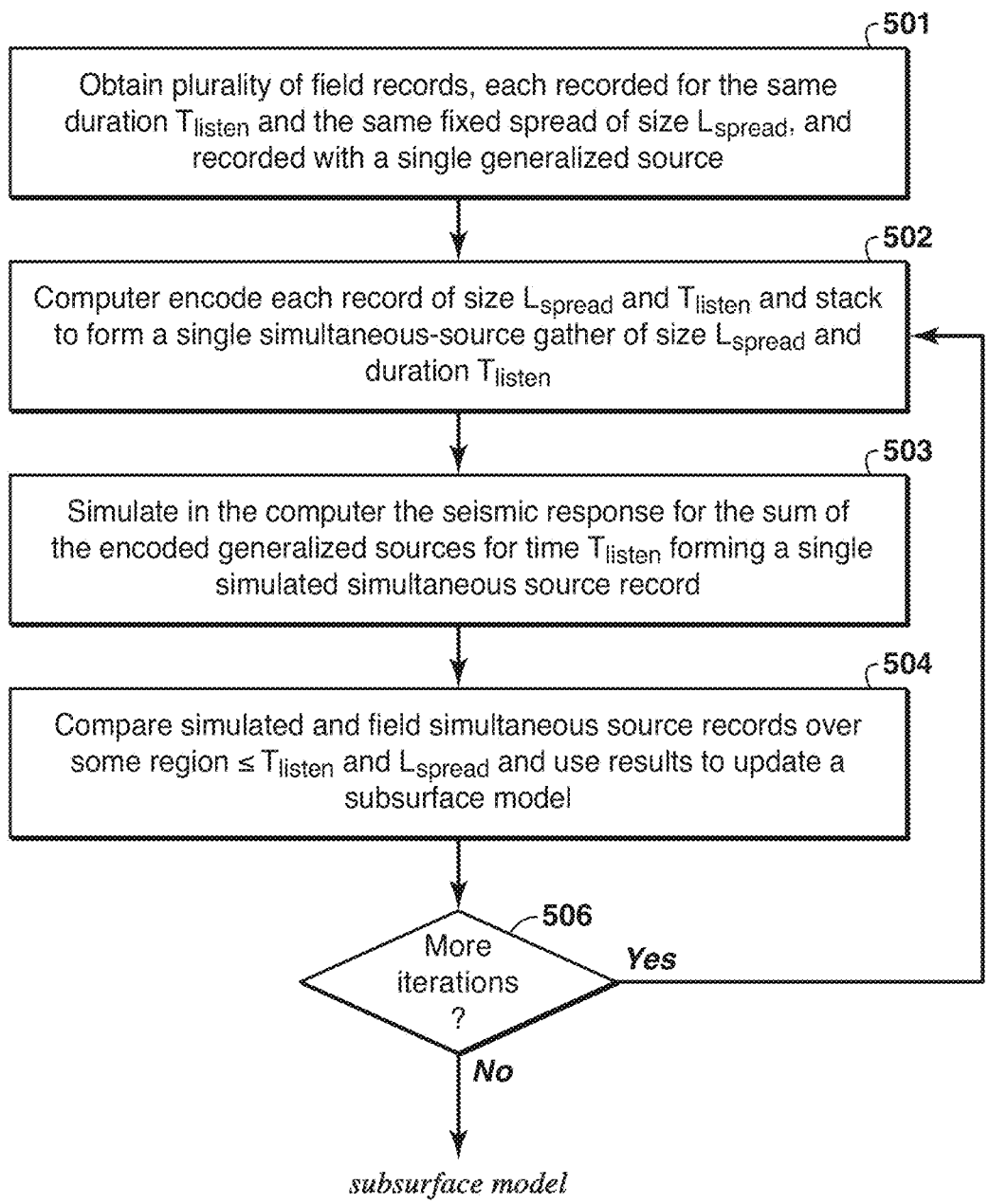
FIG. 5 is a flow chart of steps for using simultaneous encoded sourcing in the computer for iterative inversion of seismic data acquired one shot at a time as described in U.S. Pat. No. 8,121,823.
Figure 6:
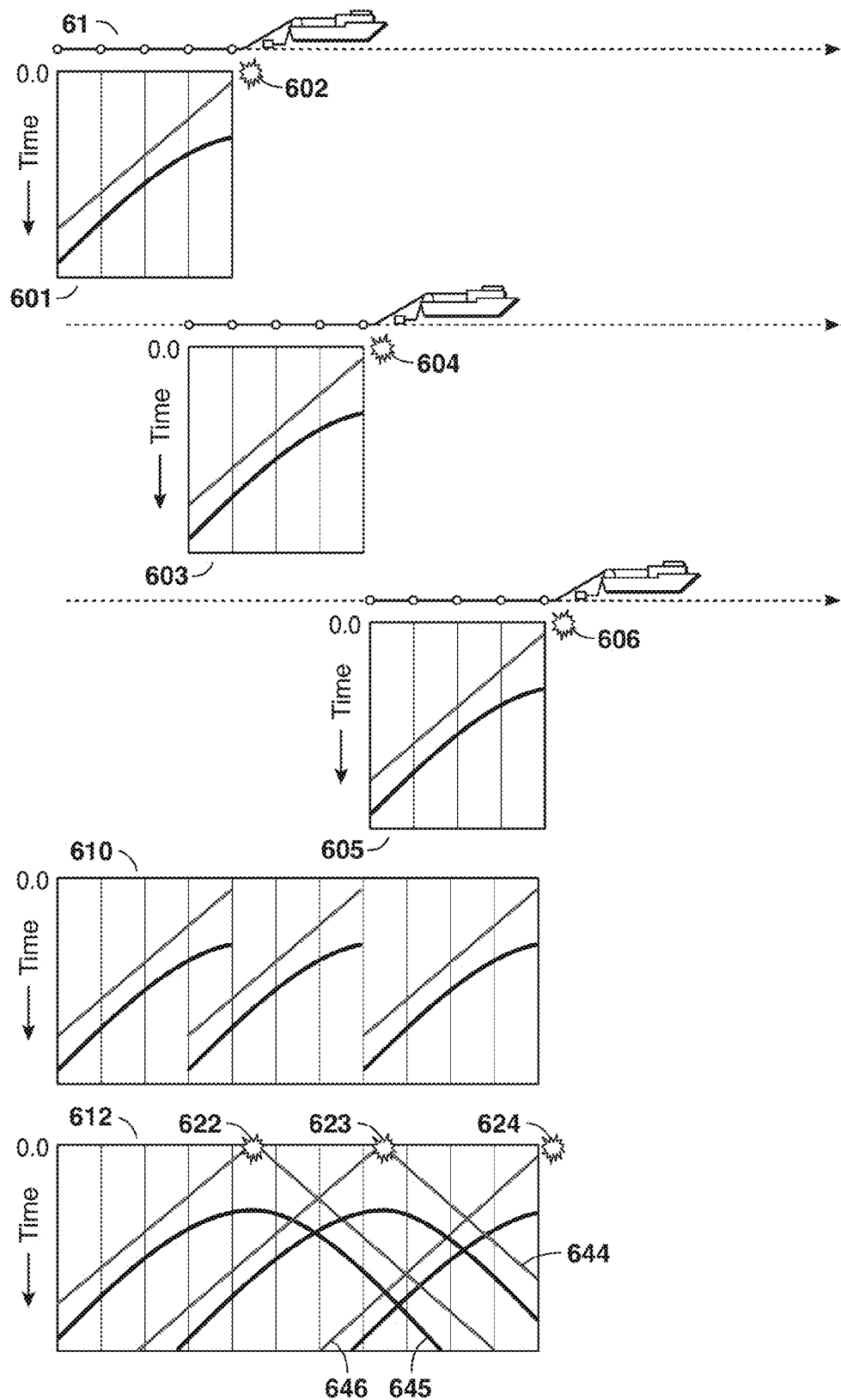
FIG. 6 illustrates the difficulty of using the steps in FIG. 5 for using simultaneous sourcing for inversion using conventional single-source marine acquisition, where the moving streamers violate the fixed-receiver assumption necessary for the method of FIG. 5.
Figure 8:
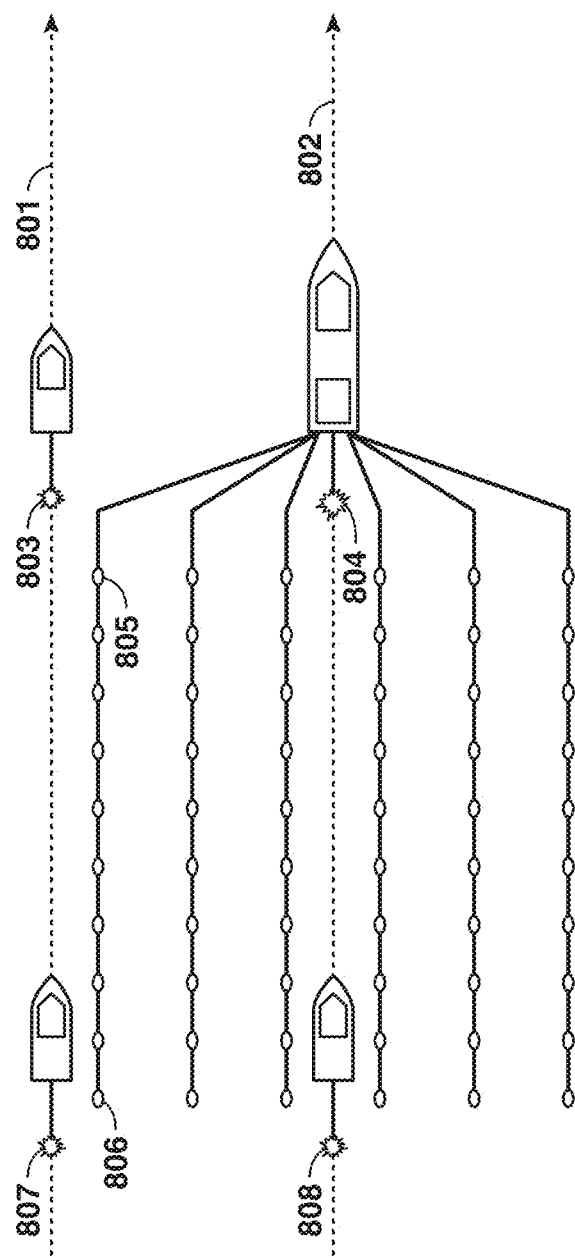
FIG. 8 is a diagram showing an example of marine acquisition and the position of source and receiver boat and streamers in one embodiment of the present inventive method.

In this section, a particular embodiment is described that overcomes the moving spread problem for marine streamer, which was illustrated in FIG. 6. This will further explain by illustration what is meant by planning acquisition to allow pseudo super-source construction in step 701, and how the pseudo super-source records are constructed in step 703. In this embodiment, an acquisition geometry and firing pattern is used so that the super-shot gathers can be constructed and better approximate the fixed-spread geometry needed for computer simulation. In Step 701, acquisition is planned that modifies the acquisition geometry shown in FIG. 1, by locating a source at the rear of the streamer for every source in the front of the streamer as shown in FIG. 8. As the source and streamer boats move forward, the rear sources follow the same source line as the front sources. Note that the sources 803 and 807 track source line 801, and sources 804 and 808 track source line 802. This is different from conventional wide-azimuth geometries that may use a rear source (Treadgold, et al., "Implementing A wide Azimuth Towed Streamer Field Trial, The What, Why, and Mostly How of WATS in Southern Green Canyon", SEG Expanded Abstracts, 2901-2903 (2006)), but locates the rear sources on different sail lines. Preferably the near offset distances are the same for both front and rear sources. For example, the distance from source 803 to the nearest receiver 805 is the same as from source 807 to its nearest receiver 806.

Figure 9:
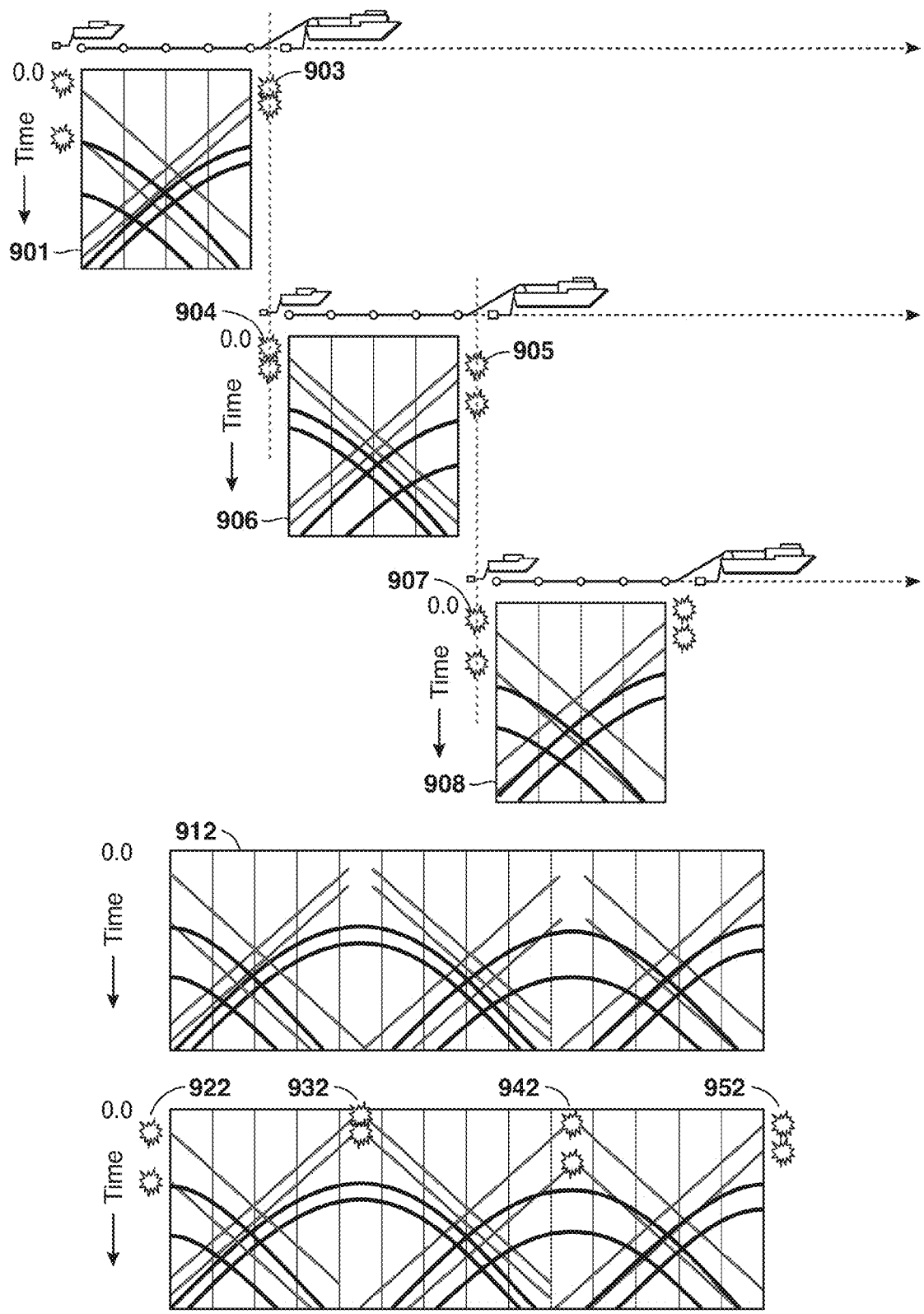
FIG. 9 is an illustration of a marine embodiment of the present invention showing source gathers as acquired and the construction of a pseudo super-source record.

All the sources fire within the same source interval but with different random time delays or random positions around the nominal source location, and a single record of fixed length is recorded as illustrated as 901 in FIG. 9. In this example, two source boats, 803 and 804 are at the front of the streamer and two source boats 807 and 808 fire at the rear of the streamer. The position of the shot projected on the source record from two front sources are shown by the sunbursts in 903. The boats move forward, all four sources firing every shot interval, for example every 25-m, with random time delays or random position jitter for each group of shots. This random time delay or position jitter is considered an encoding function. When the rear sources approach the position previously occupied by the front sources 903, then they do not fire randomly, but rather fire as close to the same position as is operationally feasible and with the same time delays relative to other rear sources that the front sources had to each other at the same location. For example, source record 906 is recorded with the rear sources firing with the same pattern 904 as when this position was occupied by the front sources for record 903 at 901. And again when the rear sources reach position 907 they fire with the same encoding function and at the same location as when the front sources were at 905; see record 908. This pattern preferably continues for the complete sail line.

In Step 703, a pseudo super-source record is constructed. Each record that was recorded with identical rear and front sources at the same position are time aligned to match the source timing and appended. Traces may be padded (i.e., zeros added) at the end or beginning. This makes one long record 912 that preferably spans the entire sail line with sources separated by approximately the length of the streamer. This pseudo super-source record now better approximates a fixed spread because both positive and negative offsets are recorded from each source position up to a distance of $D_{source}$. Here $D_{source}$ is naturally the streamer length. Now all these sources can be simultaneously simulated in the computer, for example by putting groups of sources at 922, 932, 942 and 952.

Figure 10:
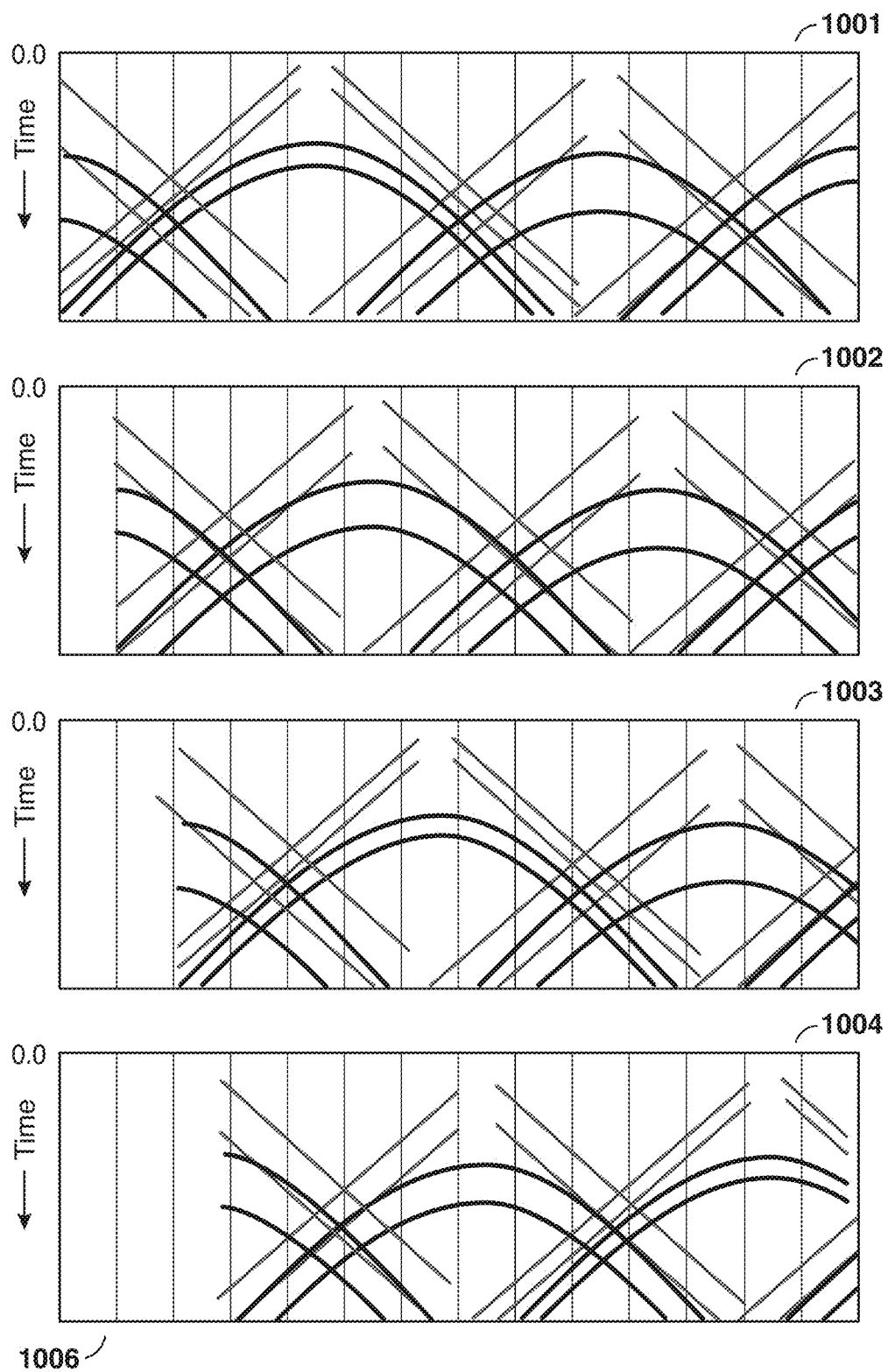
FIG. 10 is an illustration of several pseudo super-source records that could be constructed using the marine embodiment of the current invention.

In Step 703, additional pseudo super-source records are constructed, each having the same spatial extent and time duration as illustrated in FIG. 10. If the first shot was at position 0, then it starts the first super-source record. At the next interval, e.g. 25-m from the first, the second super-source record is started—its shots are shifted one shot interval from the first. This continues until the full streamer length is used and the rear sources reach the first location of the front sources. For example, super source records 1001-1004 have source positions that are shifted by a source interval. Generally, the number of super-shot records that can be generated is related to the length of the streamer divided by the shot interval. Trace padding, for example at 1006, may be needed to construct a fixed spread size for each super-record.

In Step 704, the source location and encoding information, including time shifts, are determined for each pseudo super-source record relative to the boundaries of the pseudo record. For example, the start time of each source is adjusted by the time shifts used to form the pseudo record and is now relative to zero time of the pseudo record. This information will be used in step 706, combined with the computer-encoding used in Step 705, in simultaneously simulating the encoded pseudo records.

Figure 11:
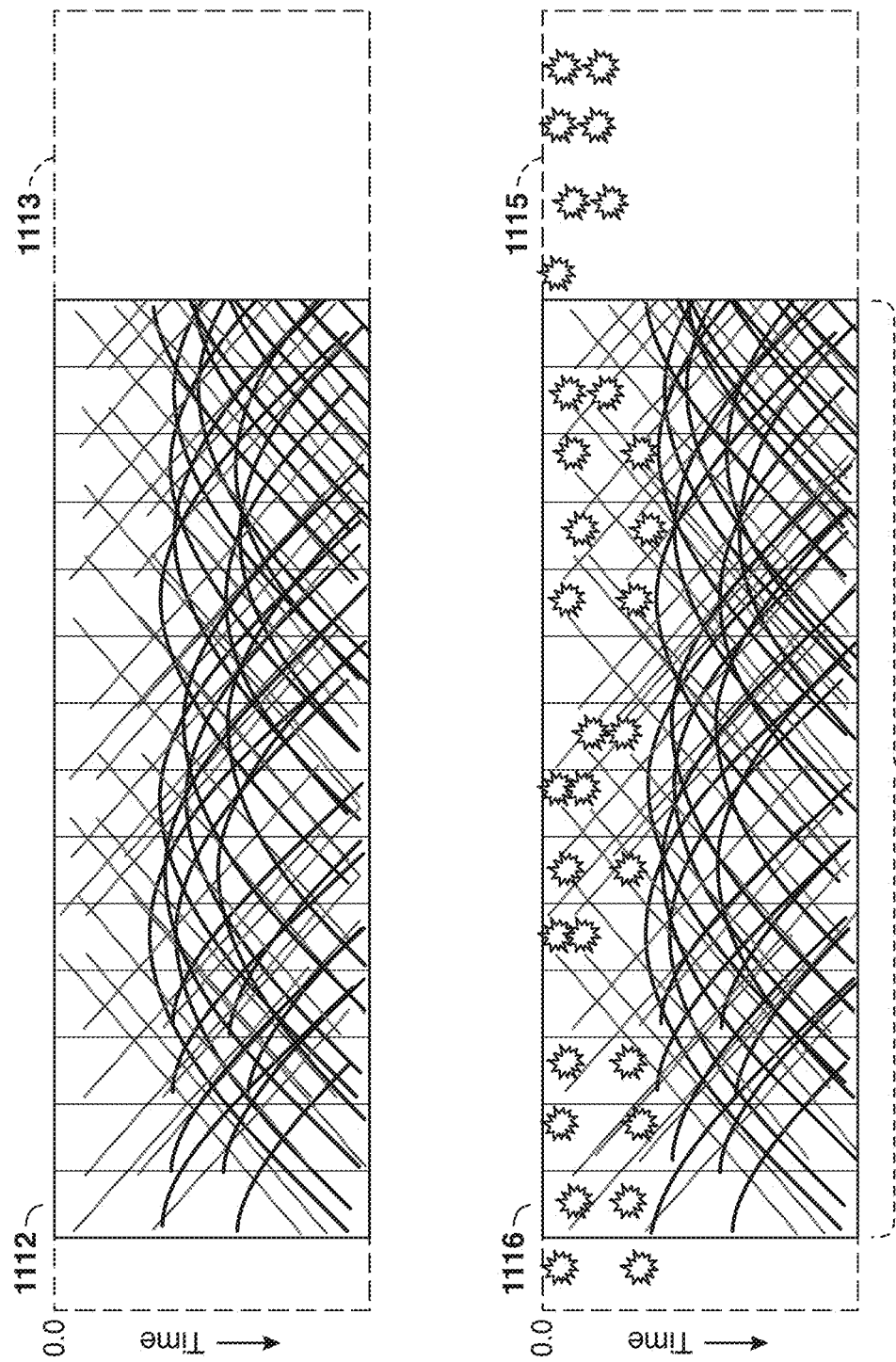
FIG. 11 is an illustration showing the construction of a simultaneous-source measured record and the simultaneous computer-simulation of all the sources in a sail line.

In Step 705, each pseudo super-source record containing many shots is encoded in the computer. Preferably this is done by randomly multiplying by +1 or −1. Alternatively, phase rotations or another form of encoding can be used. Then, the encoded pseudo records are stacked or summed, as shown in the illustration of 1112 in FIG. 11, to form one simultaneous source record for the full sail line.

In Step 706, all the sources in the sail line are computer-simulated at one time using a combination of the field encoding determined in Step 704/702 and the computer encoding used in Step 705. Further savings in computational cost may be achieved by limiting the region of the model used in a single-sail line simulation. This simulation is illustrated with the sunbursts in 1116. This may involve extending or padding the modeling space by an additional region as indicated in 1113, which allows the forward modeling to generate all the bits of energy recorded in the data window 1118. Next, in Step 707, the measured simultaneous source record over the region of interest (1118 in the example) is compared to the simulated simultaneous source record and the result is used to update the subsurface model. Because the simulated energy from all source positions that influence the region of interest are present in both the measured and simulated data—at least up to a distance and time of $D_{source}$ and $T_{source}$ from each source firing position—the problem that the comparison or misfit function is distorted by artifacts from creating the simultaneous source record is avoided. By constructing the pseudo records, the requirements of a fixed spread and small trace duration are met. With additional iterations of the inversion or imaging step, the computer encoding is preferably changed by repeating Step 705 with a different and encoding and thereby forming multiple realizations of the data that further reduce crosstalk and artifacts.

It is straightforward to modify the example shown here for different acquisition requirements involving more streamer vessels and sets of streamers and more source vessels. The source position and the firing pattern are chosen so that pseudo super-source gathers can be constructed that better approximates recording by a fixed spread for the sail line or for the entire survey. For example, additional boats towing sources can be used in front of the streamer vessel and further behind the end of the streamer and fired simultaneously with the other sources to record longer offset data for the sail line. In addition, vessels can be located on both sides of the streamer vessels so as to better approximate a cross-line fixed spread allowing all the sources in the survey to be simulated simultaneously in one computational forward modeling effort.

Land Embodiment

Figure 12:
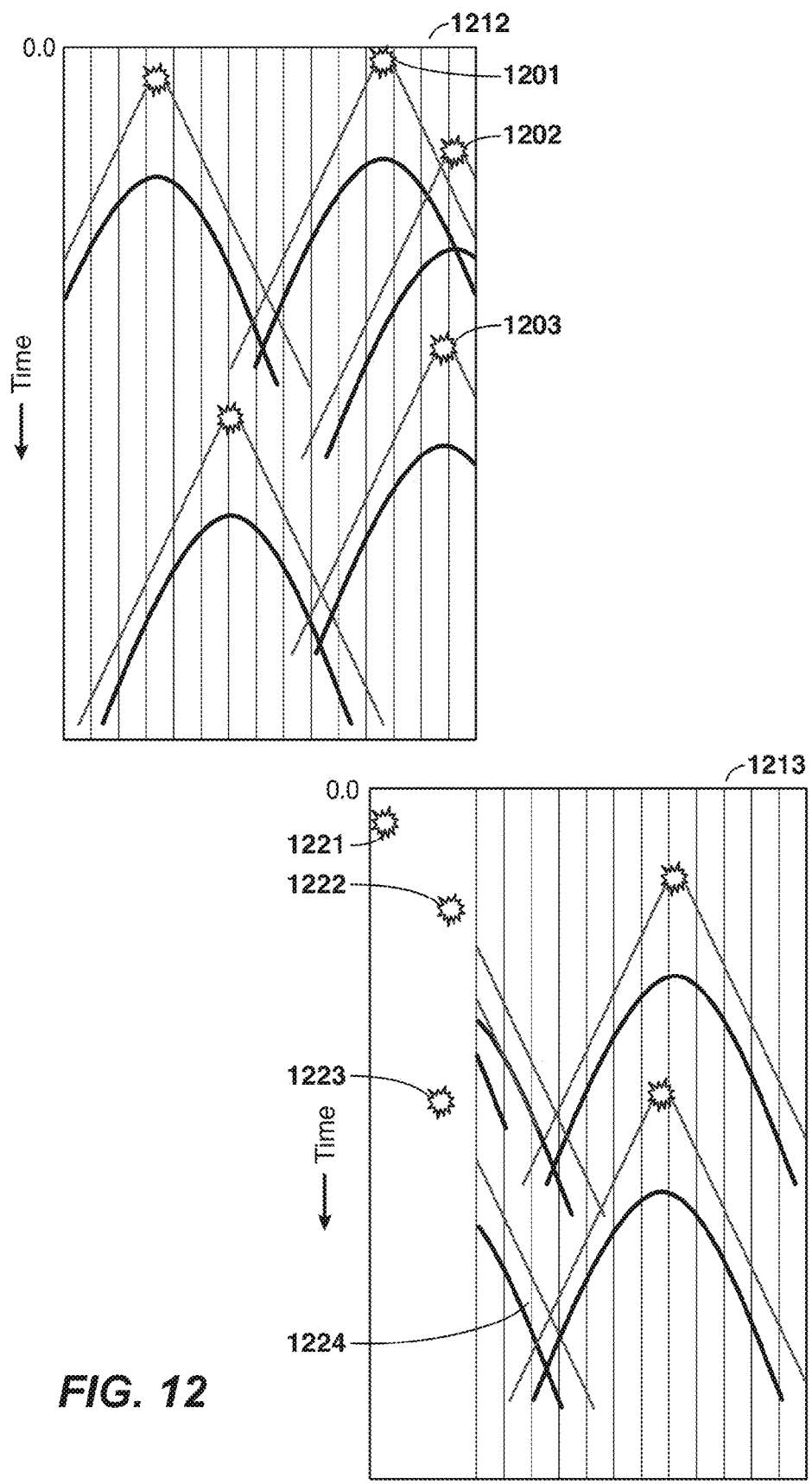
FIG. 12 shows an illustration of two field records recorded on land or on the ocean bottom with a moving spread.

Data acquisition on land or on the ocean bottom is considered next. Here sensors are not moving as in a marine streamer, but the group of active receivers may change during the survey. This is often called rolling the spread. In FIG. 12, one record at one spread position is shown as 1212 and the second record corresponding to a different set of trace positions are shown in 1213. Often the receivers may record continuously making one long record for each spread position. In Step 701, the survey is planned, and a $T_{source}$ and $D_{source}$ identified. Sourcing may be activated randomly or in a pattern. Preferably, some of the energy generated from multiple source positions overlap in time and space to reduce acquisition time and cost. When the spread is moved, source points within a distance of $D_{source}$ from the boundary are repeated for the new spread using the same relative time shifts. For example if sources 1201, 1202, and 1203 are within the distance $D_{source}$ from the boundary so that not all the energy is recorded within the distance $D_{source}$ from a source, these sources are repeated into the new spread position with the same relative time shift and the same encoding function previously used at that source position. For example 1221, 1222 and 1223 are a repeat of 1201, 1202 and 1203. This insures that the combined record has the captured the entire important signal, such as 1224, from each source.

Figure 13:
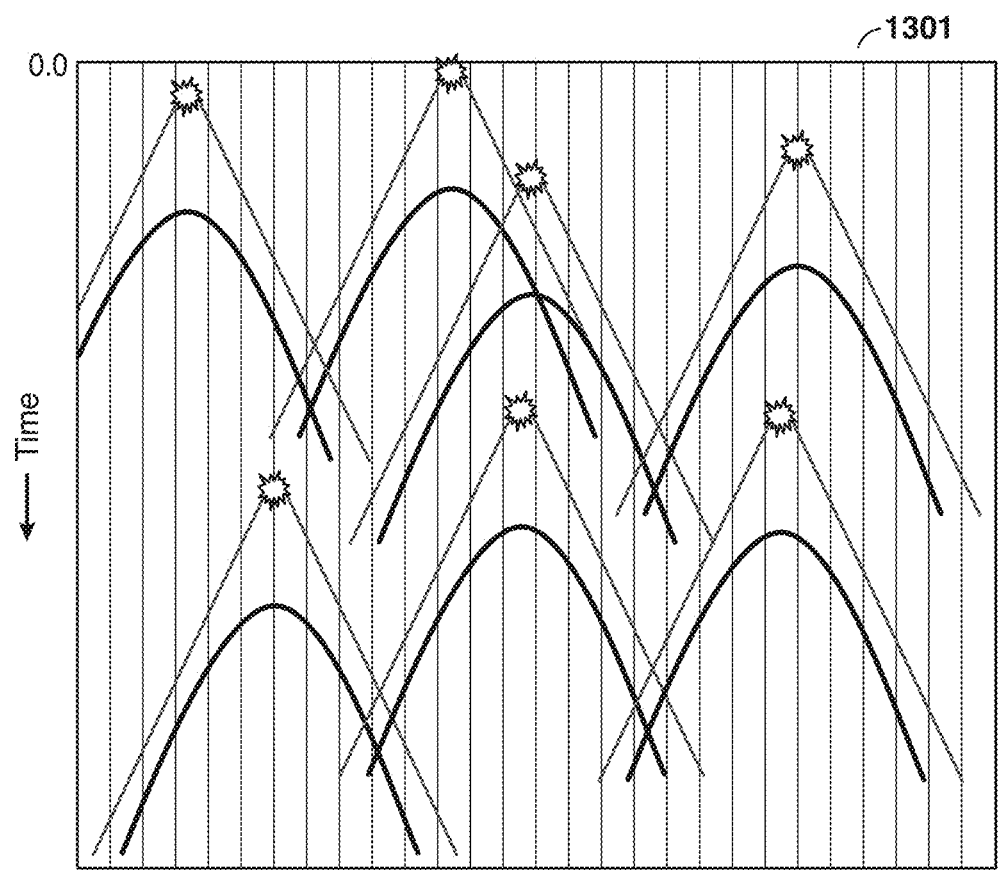
FIG. 13 illustrates generating a fixed spread from the field records of FIG. 12.
Figure 14:
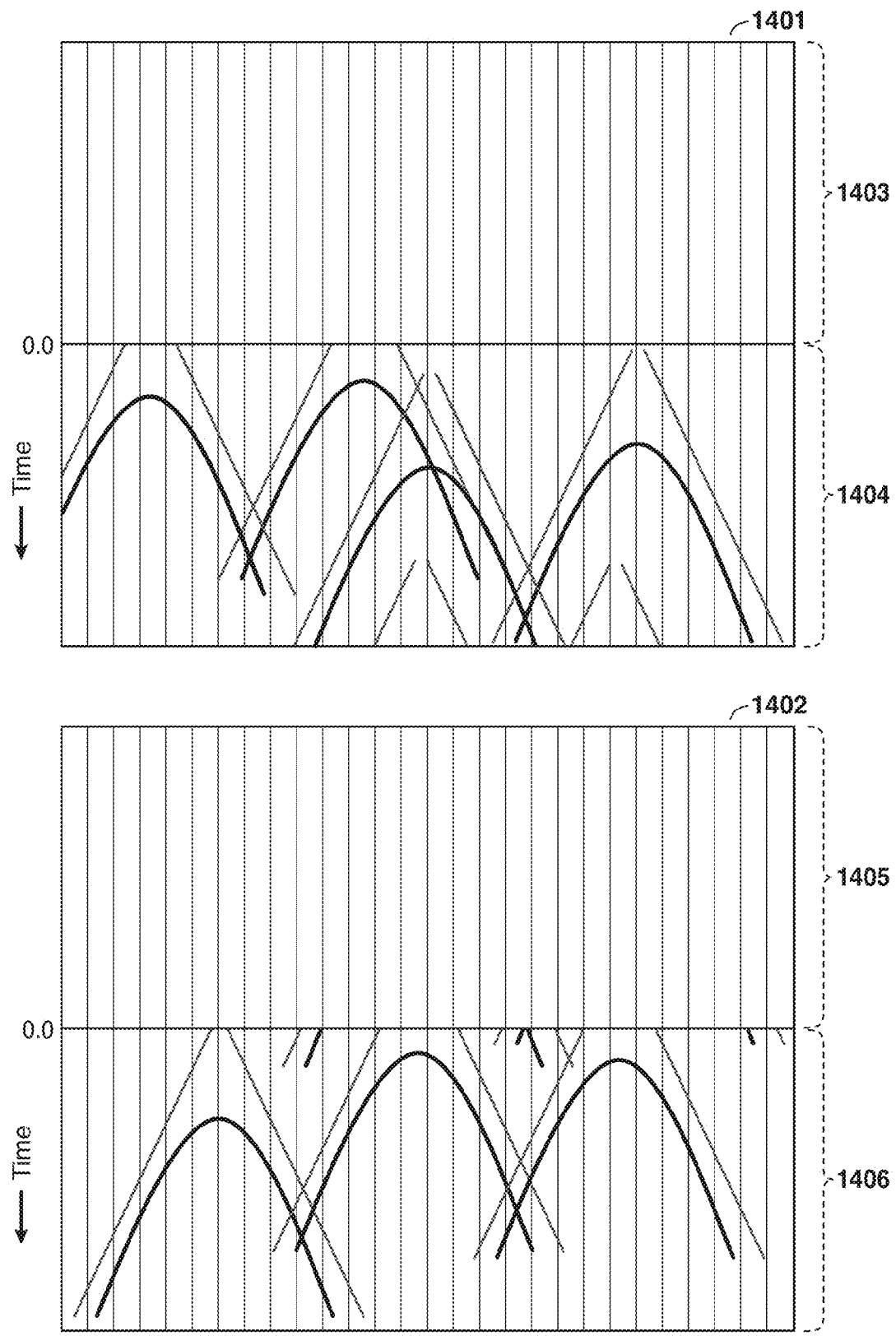
FIG. 14 is an illustration of two pseudo super-source records constructed from the combined field record of FIG. 13.

In Step 703, several pseudo super-source records of fixed size and duration are constructed. Preferably the duration is longer than $T_{listen}$ but short enough to be efficiently simulated in the computer. Construction for this example may be illustrated in two steps. In FIG. 13 the two records from FIG. 12 are combined to make a fixed spread. Because some shots near the boundary were repeated with the same relative timing and encoding function, we have insured that all the energy within a distance of $D_{source}$ and a time of $T_{source}$ are captured in the combined record. Then in FIG. 14 isolated time windows are extracted preferably of length $T_{source}$. There is not a need that the measured energy from any one-source be isolated within the window, nor does any record need to start at the firing time of any source as with pseudo-deblending. For example windows 1404 and 1406 are extracted from the record in FIG. 13. We illustrate only two records, but preferably a larger number is extracted. We pad the records in negative time by another time duration of $T_{source}$ as shown as 1403 and 1405 to make pseudo-super records 1401 and 1402.

Figure 15:
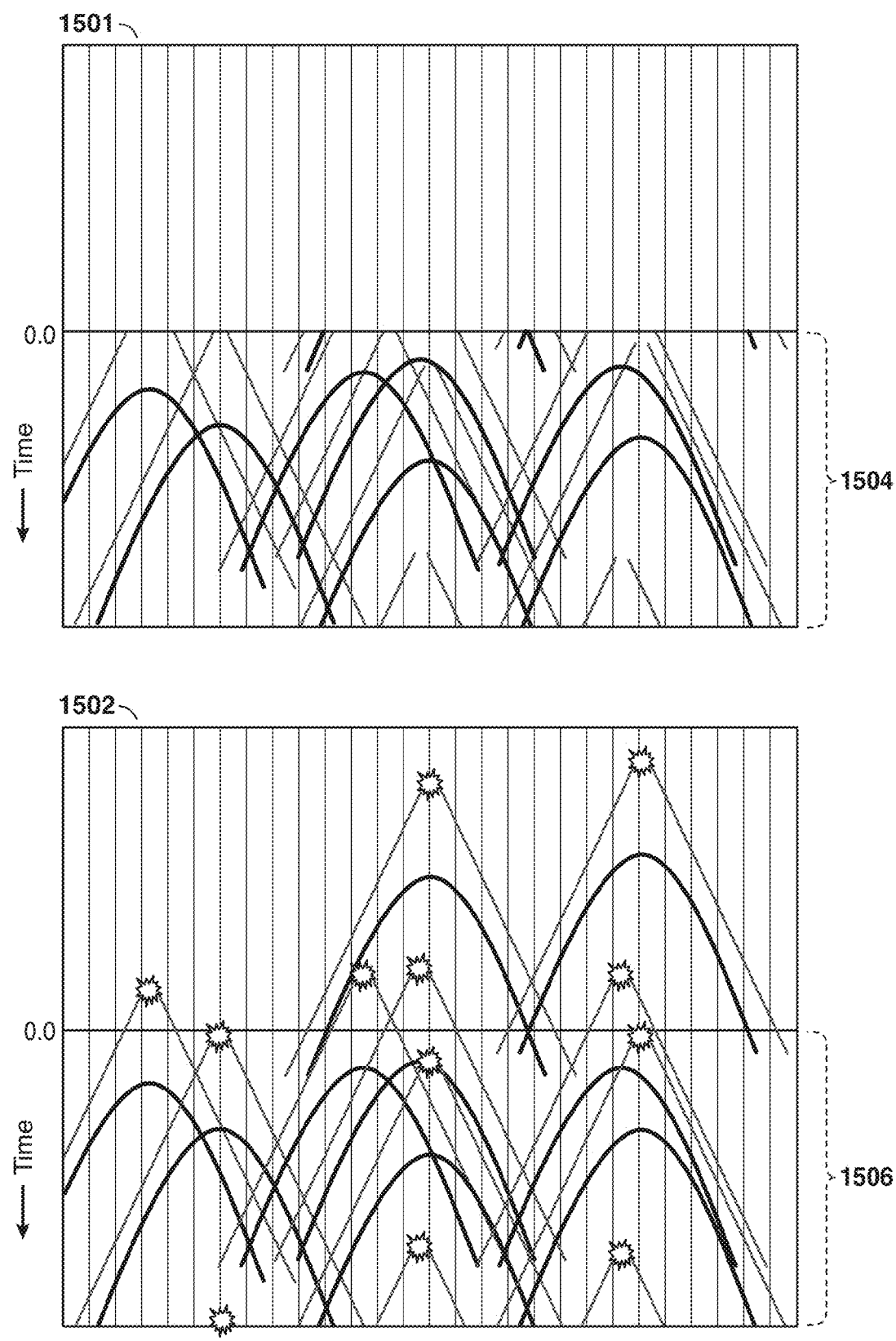
FIG. 15 illustrates the computer encoding and stack of the pseudo super-source records of FIG. 14 and its simulation in the computer with all the sources firing simultaneously.

Then in Step 704, the source locations, encoding function and firing time relative to zero time of the super source records 1401 and 1402 are identified. The sources should be within a time of $T_{source}$ from above the top of the window or within a distance of $D_{source}$ from the boundaries of the record. In Step 705, the super-source records are computer encoded and summed, making a measured simultaneous source record as illustrated in FIG. 15 as 1501. Then in Step 706, the sourcing positions and both field and computer encoding functions are used to generate a simulated simultaneous source record as illustrated in 1502. This simulation is efficient, because all the sources are simulated simultaneously for a short period of time. Next in Step 707, the measured region of interest 1504 is compared to the simulated region of interest 1506, and the result used to update a subsurface model. Because all the energy within the distance $D_{source}$ and $T_{source}$ from each source position is represented in both records, artifacts from the simultaneous record creation are avoided. With subsequent iterations of the imaging and inversion, preferably the super-source records would be combined with different encoding functions forming different realizations of all the data, reducing crosstalk noise.

EXAMPLES

Figure 16:
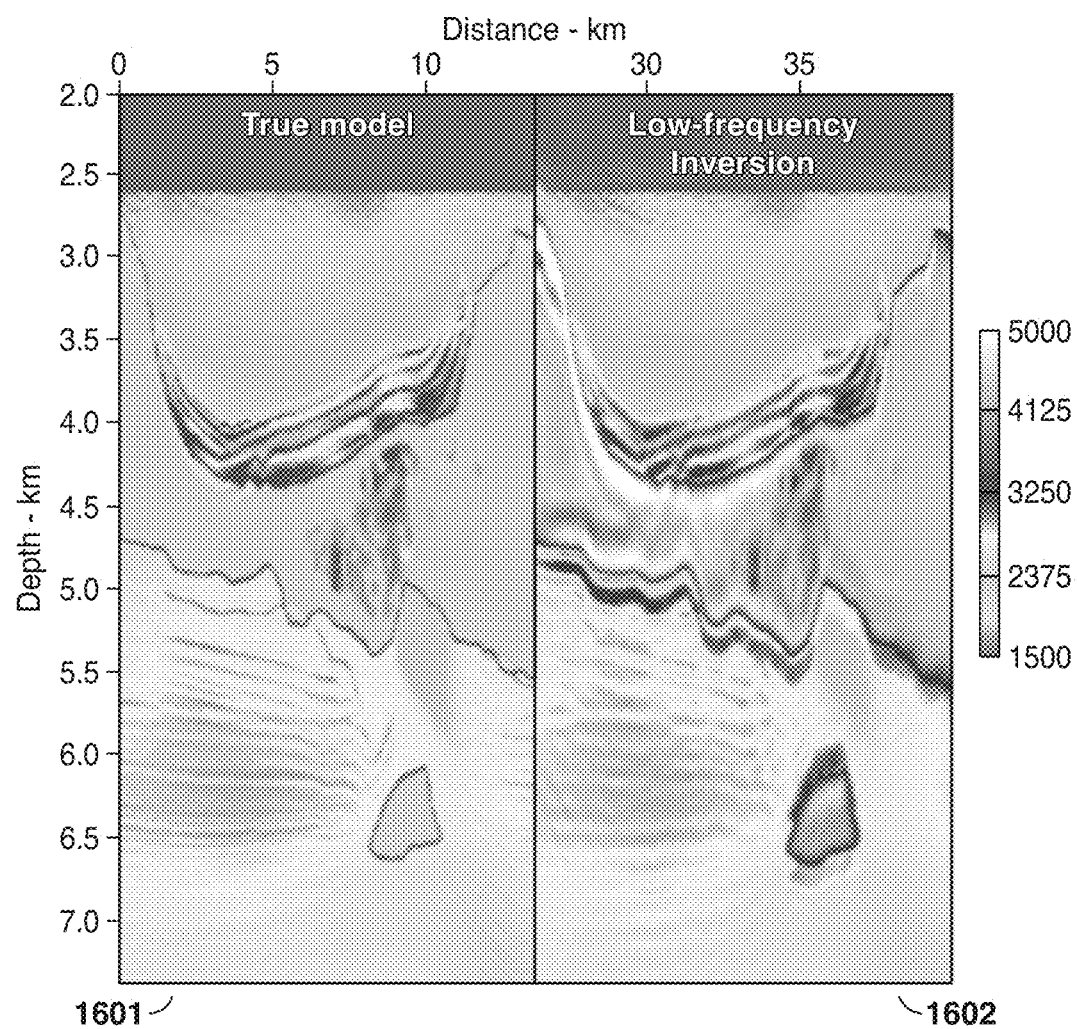
FIG. 16 shows the results of a 2-D model test of a marine embodiment of the present invention.

FIG. 16 shows a velocity model example in 2D. Due to patent law restrictions on the use of color, FIG. 16 is a black-and-white reproduction of a data display where velocity is quantitatively represented on a color scale. The data were computer-simulated with a front and rear source and field encoding with random time delays up to 200 ms using the near-surface model shown in 1601. Using the conventional method for simultaneous encoded-source inversion with the moving streamer data will not yield the correct results (not shown) because of the failure of the fixed-receiver assumption. Then the super-source gathers were constructed as described in the marine embodiment, and a low-frequency inversion was performed using the present inventive method with the results shown at 1602. It can be seen that the model inferred by data inversion using the present inventive method compares very favorably with the "true" model 1601.

The foregoing application is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined in the appended claims. Persons skilled in the art will readily recognize that in preferred embodiments of the invention, at least some of the steps in the present inventive method are performed on a computer, i.e. the invention is computer implemented.

The invention claimed is:

1. method for inferring a subsurface model of velocity or other physical property, comprising:
obtaining seismic data acquired in a survey by advancing a front source and a trailing rear source along a source line with a non-fixed spread of receivers, and activating each source at selected intervals along the source line, wherein every activation location for the rear source falls on a previous activation location for the front source, and wherein a selected field encoding is used for all source shots with the field encoding for the rear source always being the same as was previously applied to the front source at the same activation location, resulting in a series of shot records each simultaneously recording both sources but with each shot recorded by less than a full spread of receivers; and
processing the shot records by steps comprising:
(i) constructing from the shot records a plurality of pseudo super-shot records, constructed such that each has data from a full spread of receivers;
(ii) encoding each pseudo super-shot record and stacking to form a simultaneous-source record of measured data;
(iii) using a computer to simulate the simultaneous-source record of measured data, using the same encoding used in (ii) and also the field encoding, and using an assumed subsurface model of velocity or other physical property;
(iv) comparing the simulated simultaneous-source record with the simultaneous-source record of measured data, determining from that an adjustment to the subsurface model of velocity or other physical property; and making the adjustment to the subsurface model of velocity or other physical property to generate a final model; and
(v) displaying, with a computer, an image generated from the final model that includes subsurface structures.

2. The method of claim 1, wherein the acquired survey data include at least one additional, simultaneously acquired, parallel source line, wherein each source line has a front source and a trailing rear source with matching source activation locations for all source lines, wherein every activation location for a rear source on any source line falls on a previous activation location for the front source on that source line, and wherein a selected field encoding is used for all source shots with the field encoding for each rear source always being the same as was previously applied to its corresponding front source at the same activation location.

3. The method of claim 1, wherein the front source and rear source are separated by a fixed distance d that subdivides into an integer number N of shot intervals, such shot intervals being the nominal or average shot interval for the acquisition geometry. The actual shot intervals may randomly vary around this nominal value.

4. The method of claim 3, wherein N +1 pseudo-shot records are constructed in (i), each of fixed duration and spatial extent, the duration being greater than or equal to a listening time used in the survey and, in addition, is a minimum time for source shot vibrations to be reduced to a predetermined level; and the spatial extent being greater than or equal to a maximum receiver offset distance used in the survey and, in addition, is a minimum distance over which source amplitude is reduced to a predetermined level.

5. The method of claim 4, wherein (i)-(iii) are repeated a plurality of times using other shot records from other shot locations along the source line, and then (iv) is performed using results from all repetitions of (i)-(iii).

6. The method of claim 5, wherein all data acquired along the source line are included in at least one pseudo super-shot record.

7. The method of claim 1, further comprising taking the final model from (iv) and repeating steps (i)-(iv) using different computer encoding in (ii).

8. The method of claim 1, wherein the field encoding comprises one or more of random time shifts, random source positions, phase rotations, and different sweep functions.

9. The method of claim 1, wherein the constructing in (i) comprises using one or more of windowing, time shifting, padding time or traces, and appending.

10. The method of claim 1, wherein the seismic survey comprises:
- a marine survey in which a moving vessel tows one or more sources and one or more streamers of receivers; or
- a land or ocean bottom survey that involves a rolling spread of receivers as the survey progresses along a survey line.

11. A method of acquiring seismic survey data, comprising: performing the following along a source line, or along each of two or more parallel source lines:
- (a) activating a front source with a selected field encoding at a location along the source line with a first partial spread of receivers;
- (b) activating a rear source, identical to the front source, duplicating the field encoding in (a), at the same location along the source line with a second partial spread of receivers, wherein the first partial spread and the second partial spread, when combined, make a full spread of receivers for the location along the source line;
- (c) repeating (a) and (b) for one or more additional locations along the source line or lines.

12. The method of claim 11, wherein the field encoding comprises one or more of random time shifts, random source positions, phase rotations, and different sweep functions.

13. The method of claim 11, wherein the seismic survey comprises:
- a marine survey in which a moving vessel tows one or more sources and one or more streamers of receivers; or
- a land or ocean bottom survey that involves a rolling spread of receivers as the survey progresses along a survey line.

14. A method for conducting a seismic survey with a plurality of simultaneous sources and a non-fixed spread of receivers, and inferring a subsurface model of velocity or other physical property, comprising:
- (a) activating two or more sources with a selected field encoding applied to each source at a location along a source line with a first partial spread of receivers;
- (b) activating the two or more sources, or identical sources, duplicating the field encoding in (a), at the same location along the source line with a second partial spread of receivers, wherein the first partial spread and the second partial spread, when combined, make a full spread of receivers for the location along the source line;
- (c) repeating (a) and (b) for one or more additional locations along the source line;

then processing records of seismic data recorded by the receivers from the activations in (a)-(c) with steps comprising:
- (d) constructing from the shot records a plurality of pseudo super-shot records, constructed to be of the same duration and spatial extent, and such that each has data from a full spread of receiver locations;
- (e) computer encoding each pseudo super-shot record and summing to form a single simultaneous-source record of measured data;
- (f) using a computer and a subsurface model of velocity or other physical property, simulating with one forward modeling operation a simultaneous-source record of synthetic data to predict the simultaneous source record of measured data;
- (g) comparing the simultaneous source record of measured data to the simulated simultaneous source record, determining a misfit, and using the misfit to adjust the subsurface model to generate a final model; and
- (v) displaying, with a computer, an image generated from the final model that includes subsurface structures.

15. The method of claim 14, further comprising taking the final model from (g) and repeating steps (e)-(g) using a different computer encoding in (e).

16. The method of claim 14, wherein the field encoding comprises one or more of random time shifts, random source positions, phase rotations, and different sweep functions.

17. The method of claim 14, wherein the constructing in (d) comprises using one or more of windowing, time shifting, padding time or traces, and appending.

18. The method of claim 14, wherein the seismic survey comprises:
- a marine survey in which a moving vessel tows one or more sources and one or more streamers of receivers; or
- a land or ocean bottom survey that involves a rolling spread of receivers as the survey progresses along a survey line.

19. A method for iterative inversion or imaging of seismic data comprising:
- (a) obtaining one or more field records generated by two or more sources using a field encoding scheme, wherein detected returns from sources interfere in time and space;
- (b) selecting one or more operations from a group consisting of windowing, time shifting, padding time or traces, appending, and summing, then constructing a plurality of pseudo super-source records, each with the same spatial extent and time duration;
- (c) identifying sources that contribute to each pseudo super-source record along with their position, firing time and encoding function;
- (d) computer encoding each pseudo super-source record and stacking them to form a single measured simultaneous-source record;
- (e) using a subsurface model and a computer, simulating in one forward modeling operation a response of the sum of all contributing sources using a combination of the field and computer encoding schemes to make a single simulated simultaneous-source record that predicts the measured simultaneous-source record;
- (f) comparing the measured and simulated simultaneous-source records over a selected region of interest, and using the comparison to update the subsurface model;
- (g) repeating (e)-(f) at least once using the updated subsurface model until a final subsurface model is obtained; and
- (h) displaying, with a computer, an image generated from the final model that includes subsurface structures.

20. The method of claim 19, wherein some or all of the field records were recorded with a partial spread of receivers but for each source (source A) at a location with a first partial spread of receivers, the field records also have data for another source (source B) at the same location with a second partial spread of receivers, wherein source A and source B have the same field encoding at the location, and wherein data records for sources A and B can be and are appended in (b) to make a full spread of receiver data.

21. The method of claim 19, wherein the one or more seismic data field records are long, continuous records from which, in (b), time windows are selected and used to form the pseudo super-source records.

22. The method of claim 19, wherein the selected field encoding scheme is one of time shifts, phase rotations, or sweep functions.

* * * * *